(12) United States Patent
    Chesack

(10) Patent No.: US 10,399,088 B2
(45) Date of Patent: Sep. 3, 2019

(54) FOOD WASTE STORAGE AND TREATMENT SYSTEM

(71) Applicant: EMERSON ELECTRIC CO., St. Louis, MO (US)

(72) Inventor: Gregory J. Chesack, Kenosha, WI (US)

(73) Assignee: EMERSON ELECTRIC CO., St. Louis, MO (US)

( * ) Notice: Subject to any disclaimer, the term of this patent is extended or adjusted under 35 U.S.C. 154(b) by 360 days.

(21) Appl. No.: 15/321,069

(22) PCT Filed: May 28, 2015

(86) PCT No.: PCT/US2015/032974
 § 371 (c)(1),
 (2) Date: Dec. 21, 2016

(87) PCT Pub. No.: WO2015/199891
 PCT Pub. Date: Dec. 30, 2015

(65) Prior Publication Data
 US 2017/0197857 A1    Jul. 13, 2017

Related U.S. Application Data

(60) Provisional application No. 62/017,883, filed on Jun. 27, 2014.

(51) Int. Cl.
 *B02C 23/36*    (2006.01)
 *B02C 23/18*    (2006.01)
 (Continued)

(52) U.S. Cl.
 CPC .......... *B02C 23/36* (2013.01); *B02C 18/0084* (2013.01); *B02C 18/0092* (2013.01);
 (Continued)

(58) Field of Classification Search
 CPC ..... B02C 23/36; B02C 23/18; B02C 18/0092; B02C 18/0084
 (Continued)

(56) References Cited

U.S. PATENT DOCUMENTS 3,874,601 A * 4/1975 Swanson, Jr. ........... B02C 21/02
                                                     241/101.6
4,173,423 A    11/1979 Pickrell
 (Continued)

FOREIGN PATENT DOCUMENTS

AU    2010200304 A1    8/2010
CA       2153529 A1    1/1997
 (Continued)

OTHER PUBLICATIONS

International Search Report and Written Opinion for PCT/US2015/032974 dated Dec. 7, 2015; ISA/EP.
 (Continued)

*Primary Examiner* — Matthew Katcoff
(74) *Attorney, Agent, or Firm* — Harness, Dickey & Pierce, P.L.C.

(57) ABSTRACT

A system and method are provided for a food loading station having a disposer that grinds food waste that is located at a facility that processes food waste. A storage tank receives a slurry of food waste and water from the disposer for storage until the slurry is collected for transportation to an anaerobic digestion facility. An agitator is installed in the storage tank for mixing the slurry stored in the storage tank prior to collection for transportation to the anaerobic digestion facility. A discharge outlet is installed on the storage tank for connection to a discharge hose of a collection truck. The discharge outlet has an air admittance valve for admitting
 (Continued)

ambient air into the discharge hose while the slurry is sucked out of the storage tank through the discharge hose and into the collection truck.

5 Claims, 18 Drawing Sheets

(51) Int. Cl.
   *B02C 18/00* (2006.01)
   *B02C 25/00* (2006.01)
   *B65F 1/12* (2006.01)
   *C02F 11/04* (2006.01)
   *C02F 103/32* (2006.01)

(52) U.S. Cl.
   CPC .............. *B02C 23/18* (2013.01); *B02C 25/00* (2013.01); *B65F 1/127* (2013.01); *C02F 11/04* (2013.01); *C02F 2103/32* (2013.01); *C02F 2209/008* (2013.01); *C02F 2209/08* (2013.01); *C02F 2209/20* (2013.01); *Y02E 50/343* (2013.01)

(58) Field of Classification Search
   USPC .......................................................... 241/60
   See application file for complete search history.

(56) References Cited

U.S. PATENT DOCUMENTS

| | | | |
|---|---|---|---|
| 4,997,012 | A | 3/1991 | Kuziw |
| 5,308,000 | A | 5/1994 | Riley |
| 5,340,036 | A | 8/1994 | Riley |
| 5,934,576 | A | 8/1999 | Robinette |
| 6,036,055 | A | 3/2000 | Mogadam et al. |
| 6,299,774 | B1 | 10/2001 | Ainsworth et al. |
| 8,395,479 | B2 | 3/2013 | Sano et al. |
| 8,579,217 | B2 | 11/2013 | Chesack |
| 8,954,347 | B1 | 2/2015 | Einfalt |
| 2001/0007982 | A1 | 7/2001 | Brown |
| 2002/0038165 | A1 | 3/2002 | McHale et al. |
| 2003/0209489 | A1 | 11/2003 | Haerther et al. |
| 2005/0274035 | A1 | 12/2005 | Beal et al. |
| 2007/0084950 | A1 | 4/2007 | Hohl |
| 2008/0082360 | A1 | 4/2008 | Bailey et al. |
| 2009/0261974 | A1 | 10/2009 | Bailey et al. |
| 2010/0071485 | A1 | 3/2010 | Koteskey |
| 2010/0308143 | A1 | 12/2010 | Mancuso |
| 2011/0073212 | A1 | 3/2011 | Erbs et al. |
| 2011/0188978 | A1 | 8/2011 | Romacly |
| 2012/0325739 | A1 | 12/2012 | Denson, Jr. |
| 2013/0228623 | A1 | 9/2013 | Virella |
| 2013/0313349 | A1 | 11/2013 | Lowe |
| 2013/0323824 | A1 | 12/2013 | Koh |
| 2014/0306042 | A1 | 10/2014 | Chesack et al. |
| 2015/0031123 | A1 | 1/2015 | Delgado et al. |
| 2015/0121870 | A1 | 5/2015 | Delson et al. |
| 2015/0129693 | A1 | 5/2015 | Koh |
| 2015/0231637 | A1 | 8/2015 | Ali |
| 2015/0273476 | A1 | 10/2015 | Jackson |
| 2018/0354007 | A1 | 12/2018 | Daneu |
| 2019/0017796 | A1 | 1/2019 | Whiting |

FOREIGN PATENT DOCUMENTS

| | | | |
|---|---|---|---|
| DE | 202011102252 | U1 | 8/2011 |
| DE | 202013003953 | U1 | 7/2013 |
| DE | 102013200164 | A1 | 8/2013 |
| EP | 0127596 | A1 | 12/1984 |
| EP | 0796232 | A1 | 9/1997 |
| EP | 2338810 | A1 | 6/2011 |
| IN | 1347MUM2013 | | 4/2015 |
| JP | H0664705 | A | 3/1994 |
| JP | H10137726 | A | 5/1998 |
| JP | 2000084431 | A | 3/2000 |
| JP | 2001281116 | A | 10/2001 |
| JP | 2002148154 | A | 5/2002 |
| JP | 2003071415 | A | 3/2003 |
| JP | 2005029349 | A | 2/2005 |
| JP | 2010207747 | A | 9/2010 |
| KR | 101081905 | B1 | 11/2011 |
| WO | WO-2005039775 | A1 | 5/2005 |
| WO | WO-2008130289 | A1 | 10/2008 |
| WO | WO-2008138069 | A1 | 11/2008 |
| WO | WO-2011071779 | A1 | 6/2011 |
| WO | WO-2012174582 | A1 | 12/2012 |
| WO | WO-2014032117 | A1 | 3/2014 |

OTHER PUBLICATIONS

International Search Report and Written Opinion for PCT/US2015/032934 dated Aug. 24, 2015; ISA/EP.
International Search Report and Written Opinion for PCT/US2015/032925 dated Sep. 9, 2015; ISA/EP.
International Search Report and Written Opinion for PCT/US2015/032944 dated Sep. 4, 2015; ISA/EP.
International Search Report and Written Opinion for PCT/US2015/032957 dated Dec. 4, 2015; ISA/EP.
International Search Report and Written Opinion for PCT/US2015/032953 dated Sep. 4, 2015; ISA/EP.
International Search Report and Written Opinion for PCT/US2015/032963 dated Aug. 20, 2015; ISA/EP.
International Search Report and Written Opinion for PCT/US2015/032969 dated Aug. 28, 2015; ISA/EP.
International Preliminary Report on Patentability regarding PCT/US2015/032934, dated Dec. 27, 2016.
International Preliminary Report on Patentability regarding PCT/US2015/032974, dated Dec. 27, 2016.
Non-Final Office Action regarding U.S. Appl. No. 15/321,012, dated Apr. 3, 2019.

\* cited by examiner

FOOD WASTE STORAGE AND TREATMENT SYSTEM

CROSS-REFERENCE TO RELATED APPLICATIONS

This application is a 371 U.S. National Stage of International Application No. PCT/US2015/032974, filed on May 28, 2015. This application claims the benefit of U.S. Provisional Application No. 62/017,883, filed on Jun. 27, 2014. The entire disclosures of the above applications are incorporated herein by reference.

FIELD

The present disclosure relates to the disposal, storage, and treatment of food waste and, more particularly, to food waste storage and treatment systems.

BACKGROUND

This section provides background information related to the present disclosure which is not necessarily prior art.

Large scale food facilities, such as grocery stores, restaurants, cafeterias, commercial kitchens, hotels, stadiums, and the like, can generate a large amount of food waste. Traditionally, the food waste is disposed of in trash bags and hauled to a landfill. Alternatively, the food waste can be collected and transported to an anaerobic digestion facility where the food waste can be converted to methane gas, which can be captured for energy generation, and solids, which can be used for fertilizer. It is difficult, however, for large scale food facilities to store food waste for extended periods of time, to predict the optimal food waste pickup times for efficient scheduling, to determine the amount of food waste being generated or the corresponding amount of methane gas that could be produced by the food waste. Additionally, existing systems do not provide sufficient feedback or data collection to allow large scale food facilities to monitor or diagnose issues, faults, or malfunctions with the systems.

SUMMARY

This section provides a general summary of the disclosure, and is not a comprehensive disclosure of its full scope or all of its features.

In various embodiments of the present disclosure a system is provided that includes a food loading station located at a facility that processes food waste, the food loading station having a disposer that grinds food waste. The system also includes a storage tank that receives a slurry of food waste and water from the disposer for storage until the slurry is collected for transportation to an anaerobic digestion facility. The system also includes an agitator installed in the storage tank for mixing the slurry stored in the storage tank prior to collection for transportation to the anaerobic digestion facility.

In various embodiments of the present disclosure, a method is provided and includes grinding food waste with a disposer installed in a food loading station located at a facility that processes food waste. The method also includes receiving a slurry of food waste and water from the disposer with a storage tank that stores the slurry until the slurry is collected for transportation to an anaerobic digestion facility. The method also includes mixing the slurry in the storage tank with an agitator installed in the storage tank prior to collection for transportation to the anaerobic digestion facility.

In various embodiments of the present disclosure a system is provided that includes a food loading station located at a facility that processes food waste, the food loading station having a disposer that grinds food waste. The system also includes a storage tank that receives a slurry of food waste and water from the disposer for storage until the slurry is collected for transportation to an anaerobic digestion facility. The system also includes a discharge outlet installed on the storage tank for connection to a discharge hose of a collection truck, the discharge outlet having an air admittance valve for admitting ambient air into the discharge hose while the slurry is sucked out of the storage tank through the discharge hose and into the collection truck.

In various embodiments of the present disclosure, a method is provided and includes grinding food waste with a disposer installed in a food loading station located at a facility that processes food waste. The method also includes receiving a slurry of food waste and water from the disposer with a storage tank that stores the slurry until the slurry is collected for transportation to an anaerobic digestion facility. The method also includes connecting a discharge outlet installed on the storage tank to a discharge hose of a collection truck, the discharge outlet having an air admittance valve. The method also includes admitting ambient air into the discharge hose with the air admittance valve while the slurry is sucked out of the storage tank through the discharge hose and into the collection truck.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In accordance with various aspects of the present disclosure, a food waste disposal, storage, and treatment system for comminuting organic food waste and discharging the food waste into a storage tank for storage is described. Further, the food waste is periodically collected from the storage tank and transported to an anaerobic digestion facility where it is converted to methane gas and solids. The methane gas generated from the food waste can be captured and used, for example, for energy generation. The solids can be collected and used, for example, for fertilizer.

Figure 1:
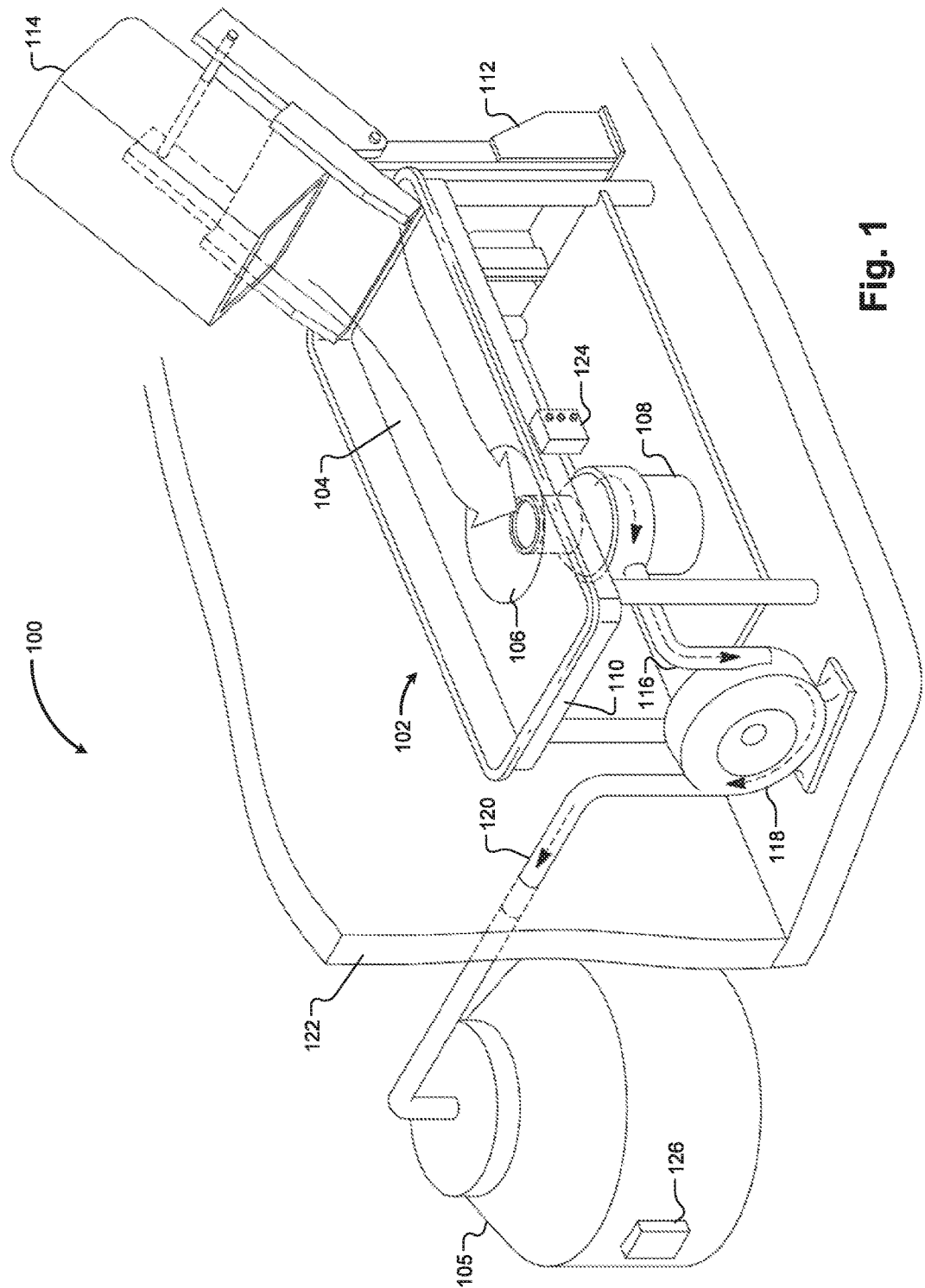
FIG. 1 is a perspective view of a food waste disposal, storage, and treatment system in accordance with an aspect of the present disclosure.

With reference to FIG. 1, a food waste disposal and storage system 100 is shown and includes a food loading station 102 and a storage tank 105. The food loading station 102 and storage tank 105 may be located, for example, at a food facility that processes food waste. For example, the food facility could be a food facility that generates food waste, such as a grocery store, a restaurant, a cafeteria, a commercial kitchen, a hotel, a stadium, or other facility that generates food waste and then processes the generated food waste using the food waste disposal and storage system 100. As another example, the food facility could process food waste that is generated at a separate facility. For example, the food facility could receive food waste transported to the facility for processing from a separate facility, such as a grocery store, a restaurant, a cafeteria, a commercial kitchen, a hotel, a stadium, or other facility that generates food waste, and then process the received food waste using the food waste disposal and storage system 100. The food loading station 102 includes a feed table 104 and a sink basin 106 that empties into a food waste disposer 108. Alternatively, the sink basin 106 may be omitted such that the disposer 108 is attached directly to the feed table 104 without the use of a sink basin 106. The feed table may be level or slanted toward the sink basin 106. Alternatively, a feed table 104 with only a portion that is slanted toward the sink basin 106 may be used. If the feed table is slanted toward the sink basin 106, food waste emptied onto the feed table 104 may be urged by force of gravity due to the pitch of the feed table 104 towards the sink basin 106 and disposer 108. Additionally, water from a water supply, such as water from a water hose connected to the water supply, may be sprayed onto the feed table 104 with a sprayer, such as an overhead sprayer. Alternatively, the feed table 104 may be configured with a water inlet connected to the water supply to provide a constant directional flow of water on or down the feed table 104. If the feed table 104 is slanted toward the sink basin 106, the flow of the water down the feed table 104 due to the pitch of the feed table 104 may then assist in moving food waste down the feed table 104 toward the sink basin 106 and disposer 108. The food loading station 102 may include raised sides 110 to prevent food waste and water from spilling off of the top surface of the food loading station 102. The feed table 104 may be constructed, for example, of stainless steel to provide a slick surface to assist in the flow of water and food waste toward the sink basin 106 and disposer 108. Additionally, the entire food loading station 102 may be constructed of stainless steel.

A bin loader 112 may optionally be installed adjacent to the food loading station 102. In installations where a bin loader 112 is installed, food waste may be collected in a storage bin 114 that is then loaded into the bin loader 112. The bin loader 112 may then rotate the storage bin 114 such that a bottom end of the storage bin 114 is raised upwards above a top end of the storage bin 114 so that the food waste contents of the storage bin 114 are emptied onto the feed table 104. The bin loader 112 may be operated, for example, with an electric motor and gear mechanism and/or with a hydraulic mechanism.

Alternatively, or in addition to the bin loader 112, an auger device may be used to transport food waste onto the feed table 104 or directly into an intake of the disposer 108. For example, food waste may be emptied into a collection area below or near the feed table 104 and an auger device may then collect and transport the food waste from the collection area onto the feed table 104 or directly into the intake of the disposer 108. The auger device may be operated, for example, with an electric motor and gear mechanism.

Food waste from the sink basin 106 enters the intake of the disposer 108 and is comminuted into a slurry mix of comminuted food waste material and any water that entered the disposer 108 from the feed table 104 and sink basin 106. For example, the disposer 108 may be a dry waste grinder, such as the dry waste grinder described in Applicant's commonly assigned U.S. Pat. No. 5,340,036, which is incorporated herein by reference. In addition to the water supply for spraying the feed table 104, the disposer 108 may include a water inlet that is directly connected to the water supply as described, for example, in Applicant's commonly assigned U.S. Pat. No. 5,308,000, which is also incorporated herein by reference.

The slurry mix of comminuted food waste material and water is discharged from the disposer 108 into a disposer discharge pipe 116 connected to a pump 118. The pump 118 pumps the mix of comminuted food waste material and water into the storage tank 105 through a pump discharge pipe 120. The pump 118 can be, for example, a hose pump, as depicted in FIG. 1. It is understood, however, than any type of suitable pump can be used with the food waste disposal and storage system 100.

The food loading station 102 and the storage tank 105 may be in separate areas. For example, the food loading station 102 and the storage tank 105 may be separated by a wall 122 and the pump discharge pipe 120 may be routed through the wall 122. For example, the food loading station 102 and the storage tank 105 may be in separate rooms of a building. Alternatively, the food loading station 102 may be located inside of a building while the storage tank 105 may be located outside of the building. Alternatively, the food loading station 102 may be located at a first level of a building and the storage tank 105 may be located at a lower level of the building. For example, the storage tank 105 may be located in a basement of the building. In some installations, depending on the location of the storage tank 105 and the proximity to the disposer 108, the pump 118 may not be required. For example, if the storage tank 105 is near the disposer 108 and/or located at a lower level from the disposer 108, the pump 118 may be unnecessary and the force of discharge from the disposer 108 may be sufficient to pump the slurry mix from the disposer 108 to the storage tank 105.

As shown in FIG. 1, and as described in further detail below, the food loading station 102 may include a controller 124 for controlling the disposer 108 and the pump 118. As discussed in further detail below, the controller 124 may also control the water supply. Additionally, as shown in FIG. 1, and as described in further detail below, the storage tank 105 may include a tank controller 126 for controlling components associated with the storage tank 105. For example, the tank controller 126 may control one or more tank heaters 128 (shown in FIG. 3). For example, when the storage tank 105 is located outside or in a colder part of the building, the tank controller 126 may control the tank heaters 128 to prevent the slurry mix of comminuted food waste material and water from freezing while in the storage tank 105. Additionally, the pump discharge pipe 120 may also be configured with a heater, if necessary, controlled by the tank controller 126 or controller 124 to prevent the slurry mix from freezing while in the pump discharge pipe 120.

Figure 2:
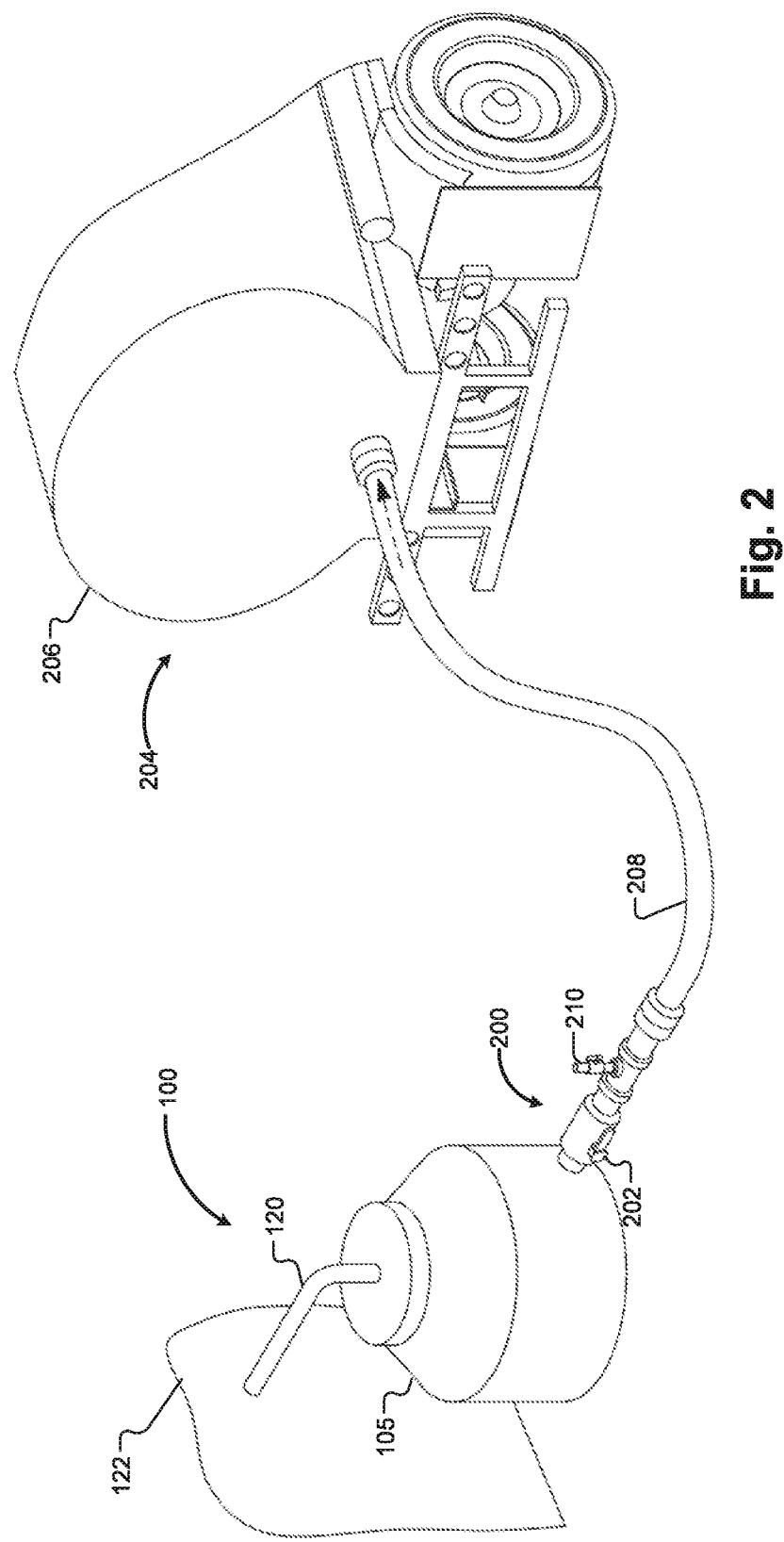
FIG. 2 is a perspective view of the storage tank of FIG. 1 connected to a transport truck in accordance with an aspect of the present disclosure.

With reference to FIG. 2, the storage tank 105 is configured with a discharge outlet 200 that includes a discharge valve 202 for allowing the slurry mix of comminuted food waste material and water to be collected from the storage tank 105. For example, a collection truck 204 may include a collection tank 206 that can be connected to the discharge outlet 200 of the storage tank 105 with a discharge hose 208. The collection truck 204 may include a suction pump for sucking the slurry mix from the storage tank 105, through the discharge hose 208, and into the collection tank 206, when the discharge valve 202 is opened. Further, the discharge outlet 200 may include an air admittance valve 210 for allowing ambient air to be introduced into the discharge hose 208 while the contents of the storage tank 105 are being sucked into the collection tank 206. The introduction of air into the discharge hose 208 during the suction operation can help to prevent clogs in the discharge hose 208 and reduce the load on the suction pump of the collection truck 204. An operator, for example, can manually adjust the air admittance valve 210 by feathering the air admittance valve 210 during the suction operation, as necessary, to introduce air into the discharge hose 208. Once the storage tank 105 is emptied, the discharge valve 202 and air admittance valve 210 are closed.

The storage tank 105 may include an exhaust tube to allow ambient air to enter into the storage tank 105 and/or to allow air from the storage tank to escape to the surrounding environment. The exhaust tube may be configured with a carbon filter to filter odor from any air exiting the storage tank 105.

The collection truck 204 can then transport the mix of comminuted food waste material and water to an anaerobic digestion facility for conversion to methane gas to be used for energy generation and to solids to be used for fertilizer. For example, the anaerobic digestion facility may operate one or more collection trucks 204 and may periodically visit food facilities to collect the slurry mix of comminuted food waste material and water from an associated storage tank 105. Further, because the food waste material can be converted into energy and fertilizer, which can be sold for money, the anaerobic digestion facility may pay the owner or operator of the food facility to collect the food waste material. For example, the compensation paid by the anaerobic digestion facility may be based on the volume of the collected slurry mix. Additionally or alternatively, the compensation paid by the anaerobic digestion facility may be based on an evaluation of the quality of the slurry mix collected or an estimated amount of energy and/or fertilizer that could be generated from the collected slurry mix. For example, the evaluation may determine the amount of food waste material in the slurry mix versus the amount of water in the slurry mix. A slurry mix that is higher in food waste material content may ultimately produce more methane gas and/or solids as compared with a slurry mix that has a lower food waste material content and a higher water content. Further, as discussed below, for a given water content, a slurry with a higher total organic carbon value or a higher chemical oxygen demand may produce more methane gas and/or solids as compared with a slurry mix that has a lower total organic carbon value or a lower chemical oxygen demand.

Figure 3:
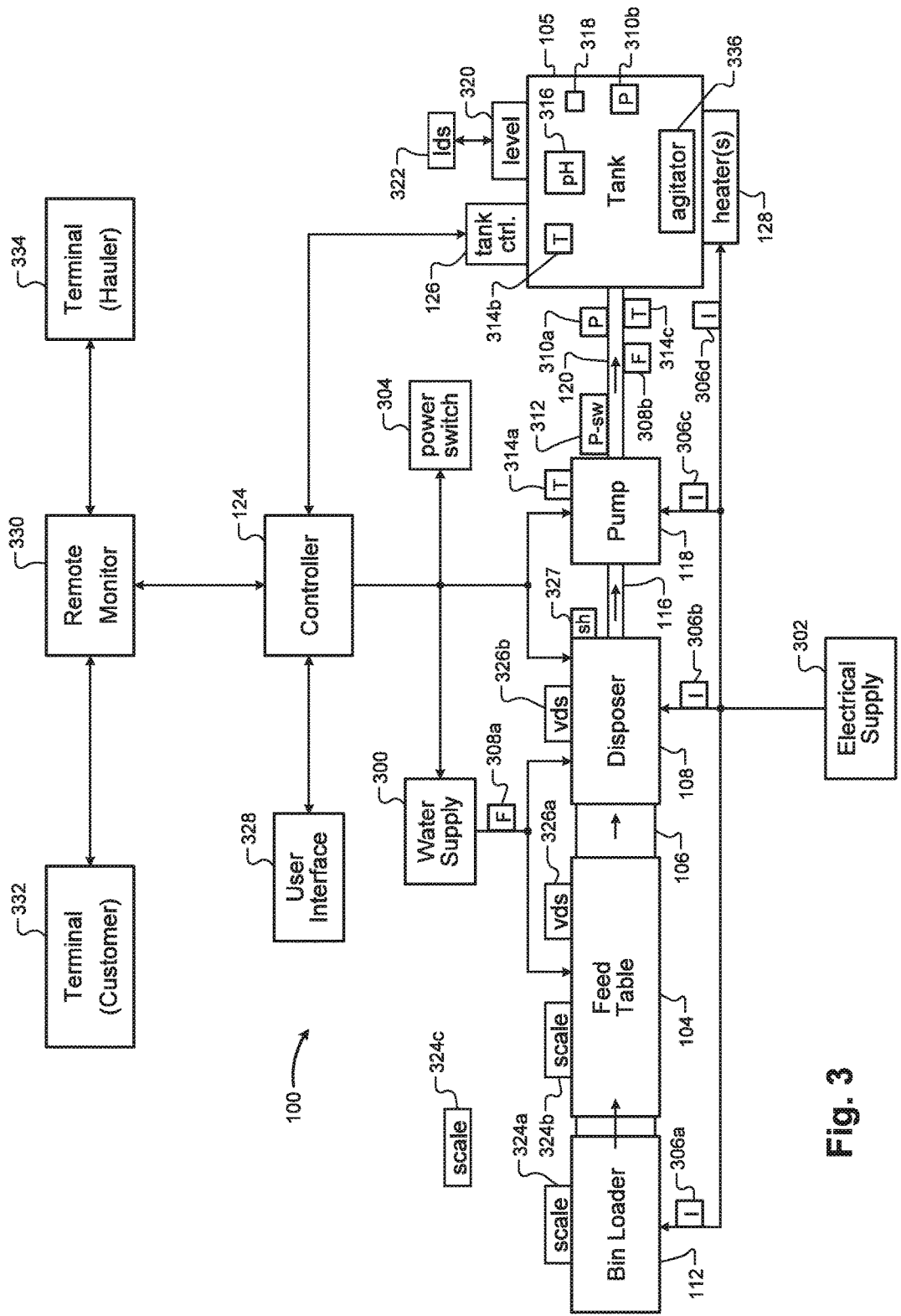
FIG. 3 is a block diagram of a monitoring and diagnostics system for a food waste disposal, storage, and treatment system in accordance with an aspect of the present disclosure.

With reference to FIG. 3, a block diagram is shown with many of the components of the food waste disposal and storage system 100 described above with reference to FIGS. 1 and 2. For example, FIG. 3 includes the bin loader 112, the feed table 104, the sink basin 106, the disposer 108, the disposer discharge pipe 116, the pump 118, the pump discharge pipe 120, the storage tank 105, the controller 124, the tank controller 126, and the tank heaters 128.

As shown in FIG. 3, the food waste material starts at the bin loader 112, if present, and moves from left to right in the Figure, as depicted by the arrows. For example, the food waste material moves from the bin loader 112 to the feed table 104 and then to the sink basin 106. As described above, an auger could be used in addition to or in place of the bin loader 112. From the sink basin 106, the food waste material is comminuted in the disposer into comminuted food waste material and is pumped by the pump 118 from the disposer discharge pipe 116 to the pump discharge pipe 120 and into the storage tank 105.

As further shown in FIG. 3, the controller 124 is in communication with and controls the disposer 108 and pump 118. The controller 124 may also be in communication with the tank controller 126. Alternatively, the tank controller 126 may operate independently of, and without communication with, the controller 124.

The controller 124 may also control a water supply 300. For example, as discussed above, the water supply 300 may provide water flow to the feed table 104, to a water hose with a sprayer for spraying water onto the feed table 104, and/or directly to the disposer 108. The controller 124 may control the flow of water of the water supply 300. For example, a flushing water control for a food waste disposer based on visual detection of food waste is described in Applicant's commonly assigned U.S. Pat. No. 8,579,217, which is incorporated herein by reference, as discussed above.

As shown in FIG. 3, an electrical supply 302 provides electrical power to a number of components of the food waste disposal and storage system 100. For example, the electrical supply 302 supplies power to the bin loader 112, the disposer 108, the pump 118, and the tank heaters 128. Additionally, the controller 124 controls a power switch 304, which controls the supply of power to components of the system. If necessary, for example, the controller 124 can control the power switch 304 to disconnect power to some or all of the system components. For example, in the event of a clog or jam in the system or in the event that the storage tank 105 is full, the controller 124 can control the power switch 304 to disconnect power from the bin loader 112, disposer 108, pump 118, and/or the tank heaters 128.

As shown in FIG. 3, the food waste disposal and storage system 100 is configured with a number of sensors that communicate sensed data back to the controller 124. For clarity, communication lines from the sensors to the controller 124 are omitted from FIG. 3. It is understood, however, that the various sensors communicate sensed data back to the controller 124 via wired or wireless communication connections.

For example, the food waste disposal and storage system 100 may include a number of electrical sensors. For example, the food waste disposal and storage system 100 may include a number of current sensors 306 for sensing electrical current being drawn by a specific component or group of components. For example, the food waste disposal and storage system 100 may include a current sensor 306a associated with the bin loader 112. In the event an auger is used, a corresponding current sensor for the auger may likewise be used. Further, the food waste disposal and storage system 100 may include a current sensor 306b associated with the disposer 108 and a current sensor 306c associated with the pump 118. Further, the food waste disposal and storage system 100 may include a current sensor 306d associated with the tank heaters 128. Although FIG. 3 shows current sensors 306 for each of the components, voltage sensors or power meter sensors may alternatively or additionally be used with or instead of the current sensors 306.

In addition, the food waste disposal and storage system 100 may include a number of flow sensors 308. For example, a flow sensor 308a may sense a flow rate of the water supply 300. While a single flow sensor 308a is shown for the water supply 300, two flow sensors may be used instead to sense the flow rates for the water being supplied to each of the feed table 104 and the disposer 108. In this way, the controller 124 can determine and monitor the amount of water being supplied to the feed table 104 and the disposer 108 and determine or estimate an amount of water that is ultimately introduced into the storage tank 105 from the water supply 300.

In addition, a flow sensor 308b may sense a flow rate of the slurry mix of comminuted food waste material and water being pumped from the pump 118 to the storage tank 105. Alternatively or additionally, a pressure sensor 310a may be used to sense a pressure of the mix of comminuted food waste material and water in the pump discharge pipe 120. In this way, the controller 124 can monitor the flow and/or pressure within the pump discharge pipe 120 and determine when the pump discharge pipe 120 has become clogged, for example. Additionally, the pump 118 may be equipped with a pressure switch 312 that deactivates the pump 118 when the pressure within the pump 118 or within the pump discharge pipe 120 is above a predetermined threshold. In this way, in the event of a clog in the pump 118 or in the pump discharge pipe 120, the pump 118 can be deactivated before the pump 118, or other components, such as the pump discharge pipe 120, are damaged.

In addition, the food waste disposal and storage system 100 may include a number of temperature sensors 314. For example, the pump 118 may include a temperature sensor 314a that senses a temperature of the pump 118, a temperature of an electric motor that drives the pump 118, and/or a temperature of a lubricant sump within the pump 118. In this way, the controller 124 may determine when the pump 118 is overheating or about to overheat and can appropriately deactivate the pump before it is damaged.

Further, the storage tank 105 may include a temperature sensor 314b to sense a temperature of the slurry mix of comminuted food waste material and water in the storage tank 105. The tank controller 126 may also receive the temperature data from the temperature sensor 314b and may control the tank heaters 128 to maintain a temperature of the slurry mix of comminuted food waste material and water in the storage tank 105 above a threshold level so that the slurry mix does not freeze in the storage tank 105. Additionally, in warmer climates the food waste disposal and storage system 100 may include refrigeration or cooling units for the storage tank 105. In such case, the tank controller 126 may control the refrigeration or cooling units to maintain a temperature of the slurry mix below a threshold level so that the slurry mix does not get too warm. In this way, biological activity within the storage tank 105 may be impeded to maximize the potential energy value of the slurry. As discussed in further detail below, the temperature of the slurry mix can also be used to evaluate the potential methane gas yield from the slurry mix. The storage tank 105 may also include a pH sensor 316 that senses a pH of the mix in the storage tank 105. The pH can also be used to evaluate the potential methane gas yield from the mix. Other chemical composition sensors 318 may also be used to sense a chemical composition of the mix in the storage tank 105. Additionally, the pump discharge pipe 120 may include a temperature sensor 314c to sense a temperature of the slurry mix in the pump discharge pipe 120. A separate heater or heaters may be used to heat the pump discharge pipe 120, depending on the location of the storage tank 105. For example, if the storage tank 105 is located outside, a portion of the pump discharge pipe 120 may also be outside and may need to be heated to keep from freezing in cold weather. The tank controller 126 may receive the temperature data from the temperature sensor 314c and may control the heaters for the pump discharge pipe 120 to maintain a temperature of the slurry mix in the pump discharge pipe 120 above a threshold level so that the slurry mix does not freeze in pump discharge pipe 120.

The storage tank 105 may include a level sensor 320 that senses a level of the slurry mix in the storage tank 105. As discussed in further detail below, the sensed level of the slurry mix can be used to schedule a collection time for a collection truck 204 to visit the food facility and collect the slurry mix in the storage tank 105. In addition, the level sensor 320 may be connected to a leak detection system 322. The leak detection system 322 may utilize level data from the level sensor 320, in conjunction with data from the pressure sensors 310a, 310b and/or flow sensor 308b for the pump discharge pipe 120 to detect a leak in the system and generate an alert to the controller 124, which can be communicated to an operator or owner of the food waste disposal and storage system 100. Additionally, the storage tank 105 may include a pressure sensor 310b that senses a pressure of the interior of the storage tank. The leak detection system 322 may also utilize the pressure data from the pressure sensor 310b to determine whether there is a leak in the system. Additionally, the controller 124 may monitor the pressure from the pressure sensor 310b, in conjunction with other data, to determine if the discharge valve 202 or the air admittance valve 210 have been mistakenly left open. In such case, the controller 124 can generate an appropriate alert or notification to an owner or operator of the system.

As shown in FIG. 3, scales 324 may be used to weigh the food waste being introduced into the food waste disposal and storage system 100. For example, the bin loader 112 can be equipped with a scale 324a to weigh a storage bin 114 being loaded into the bin loader 112. For example, the controller 124 may store a predetermined weight associated with the storage bin 114 and may then determine an amount of food waste being introduced into the food waste disposal and storage system 100 based on the weight indicated by the scale and the stored weight of the storage bin 114. Additionally or alternatively, the feed table 104 may be equipped with a scale 324b that weighs food waste deposited directly onto the feed table 104. Additionally or alternatively, the food waste disposal and storage system 100 may include a standalone scale 324c for weighing food waste being deposited into the food waste disposal and storage system 100.

Further, the food waste disposal and storage system 100 may be equipped with one or more visual detection systems 326 to determine when food waste is present at a location in the system or above a predetermined threshold at a location in the system. For example, the feed table 104 may be equipped with a visual detection system 326a that detects when food waste is present on the feed table 104. Additionally or alternatively, the disposer 108 may be equipped with a visual detection system 326b that detects when food waste is present at the intake of the disposer 108. A visual detection system 326, for example, is described in Applicant's commonly assigned U.S. Pat. No. 8,579,217, which is incorporated herein by reference. The visual detection system 326 may be in communication with the controller 124 and may activate a flow of water from the water supply 300 into a water inlet of the disposer 108. For example, the controller 124 may activate a flow of water from the water supply 300 into the water inlet of the disposer 108 when the visual detection system 326b detects that food waste is present at the intake of the disposer. The controller 124 may also deactivate the flow of water from the water supply 300 into the water inlet of the disposer 108 after a predetermined time period of inactivity, based on monitoring by the visual detection system 326a, 326b. For example, once the visual detection system 326b has not detected food waste present at the intake of the disposer for a predetermined time period, the controller 124 may deactivate the flow of water into the water inlet of the disposer 108.

Further, as described above, water from the water supply 300 may be sprayed onto the feed table 104 with a sprayer. The controller 124 may determine when water is being sprayed onto the feed table 104 with the sprayer and may deactivate the flow of water into the water inlet of the disposer 108 when the sprayer is activated. In this way, the controller 124 may control the flow of water such that water is not introduced from both the sprayer and the water inlet of the disposer 108 at the same time. Once the controller 124 determines that water is no long being sprayed onto the feed table 104 with the sprayer, the controller 124 may again activate the flow of water into the water inlet of the disposer 108. The controller 124 may be in communication with the sprayer to determine when the sprayer is activated. Additionally or alternatively, the controller 124 may be in communication with a water detection system that determines when water is flowing from the sprayer and/or when water is flowing onto the feed table 104.

As shown in FIG. 3, the disposer 108 may be configured with a splash hood sensor 327 that determines when the splash hood of the disposer 108 has been removed. In such case, when the splash hood of the disposer has been removed, the controller 124 can generate an appropriate alert or notification to an owner or operator of the system and can disable operation of the disposer 108 until the splash hood has been put back or replaced.

As shown in FIG. 3, the storage tank 105 may be equipped with an agitator 336 that stirs or mixes the slurry mix contents of the storage tank 105. Over time, without stirring or mixing, the slurry mix contents of the storage tank 105 can separate with heavier food waste material sinking to the bottom of the storage tank and water and froth rising to the top of the storage tank 105. The separated slurry mix, however, may be more difficult to evacuate from the storage tank 105 during a suction operation when a collection truck 204 sucks the slurry mix from the storage tank 105, as described above. To maintain a more uniform non-separated mixture of the slurry mix, the agitator 336 may be used to stir or mix the contents of the storage tank 105. The agitator 336 may include, for example, agitator blades configured to turn within the storage tank 105 to stir and mix the slurry mix contents of the storage tank 105. The agitator 336 can be operated by an electric motor connected to the electrical supply 302 and controlled by the tank controller 126. In such case, an additional current sensor 306 may be used to sense the current drawn by the agitator.

Alternatively, the agitator 336 can be configured to be powered by the suction pump of the collection truck 204 through the connection of the discharge hose 208 to the discharge outlet 200 of the storage tank 105. For example, upon connection of the discharge hose 208 to the discharge outlet and operation of the suction pump of the collection truck 204, the agitator 336 may be configured to turn as a result of the suction action caused by the suction pump. Alternatively, the suction pump of the collection truck 204 could be reversible such that it can be operated in a suction mode or in a discharge mode. In the discharge mode, the suction pump could be configured to pump ambient air into the storage tank and the agitator 336 can be configured to turn as a result of the air being pumped into the storage tank 105. In such case, when a collection truck 204 arrives at a food facility for collection of the slurry mix from the storage tank, the operator of the collection truck 204 could connect the discharge hose 208 to the discharge outlet 200 and run the suction pump in the discharge mode to operate the agitator 336 for a predetermined time period before performing the collection operation. In this way, the slurry mix contents of the storage tank 105 will be more uniformly mixed before the collection operation, resulting in a smoother collection operation, with less clogging and reduced load on the suction pump of the collection truck 204.

As shown in FIG. 3, the controller 124 is equipped with a user interface 328 for receiving input from a user or operator of the food waste disposal and storage system 100 and for displaying output to the user or operator. For example, the user interface 328 can receive input from the user or operator indicating that food waste is ready to be processed so that the controller 124 can initiate system components appropriately. Additionally, the controller 124 can direct the user interface 328 to display alerts or notifications to the user or operator of the system indicating, for example, that the storage tank 105 is full or close to full, that there is a clog in the system, and/or that the pump 118, disposer 108, tank heaters 128, or other components, are malfunctioning or in need of maintenance or repair. Additionally, the user interface 328 can receive input indicating a unique identifier for the user or operator. In this way, the controller 124 can associate, track, and store particular food waste loading and disposing operations with particular users or operators. In this way, the data associated with particular users can be reviewed to determine whether, for example, a particular user is utilizing too much water during a food waste loading operation or taking too much time to perform a food waste loading operation. Additionally, data associated with a group of users or operators can be compared. For example, the data can be reviewed to determine whether a particular user generally causes an abnormally high or low number of faults or malfunctions. In this way, the system can determine whether additional training is needed for a user or group of users.

Further, as discussed in further detail below, controller 124 can communicate with a remote monitor 330 located at a central location remote from the food facility that monitors and analyzes collected data about the food waste disposal and storage system 100 received by and stored at the controller 124. The remote monitor 330, for example, may include a server or other computing device executing monitoring and diagnostics software for implementing the functionality of the present disclosure. The remote monitor 330 may communicate with the controller 124 over an appropriate wired or wireless network connection. For example, the remote monitor 330 may communicate with the controller 124 over a wide area network (WAN), such as the internet. Alternatively, the remote monitor 330 may be located at the same food facility as the controller 124 and may communicate with the controller 124 over a local area network (LAN). Further, although the remote monitor 330 is shown in FIG. 3 as being in communication with a single controller 124, it is understood that the remote monitor 330 can be in communication with multiple controllers 124 at multiple different food facilities over a large geographic area. As such, the remote monitor 330 can perform the communication, monitoring, and diagnostic operations described herein for multiple controllers 124 at multiple different food facilities.

The remote monitor 330 may also be in communication with a customer terminal 332 associated with, and for use by, an owner or operator of the food waste disposal and storage system 100. In this way, an owner or operator of the food waste disposal and storage system 100 can retrieve data associated with the food waste disposal and storage system 100 or receive associated alerts or notifications. Additionally, the remote monitor 330 may likewise be in communication with a hauler terminal 334 associated with, and for use by, a food waste hauler, such as a food waste hauler that operates a collection truck 204. As described in further detail below, the remote monitor 330 may communicate with the hauler terminal 334 to make appropriate scheduling arrangements for collection of the mix within the storage tank 105. Likewise, although the remote monitor 330 is shown in FIG. 3 as being in communication with a single customer terminal 332 and a single hauler terminal 334, it is understood that the remote monitor 330 can be in communication with multiple customer terminals 332 for a single customer having, for example, multiple different food facilities, as well as multiple customer terminals 332 associated with multiple different customers or food facilities. Likewise, the remote monitor 330 can be in communication with multiple hauler terminals 334 associated with multiple different haulers.

The customer terminal 332 and the hauler terminal 334 may be any suitable computing device with an appropriate network connection for communication with the remote monitor 330. For example, the customer terminal 332 and hauler terminal 334 may include desktop computers, laptop computers, tablet devices, mobile devices, such as smartphones or personal digital assistants (PDAs), or any other suitable computing device. The customer terminal 332 and hauler terminal 334 may communicate with the remote monitor 330 over a wired or wireless network connection. Further, the customer terminal 332 and hauler terminal 334 may communicate with the remote monitor 330 over a LAN connection or a WAN connection.

The monitoring and diagnostic service provided by the remote monitor 330 may be performed on a subscription basis for a customer, such as an owner or operator of the food facility. The subscription may include, for example, a periodic subscription fee, such as a weekly, monthly, or annual subscription fee. Further the provider of the monitoring and diagnostic service may sell or lease the equipment and hardware for the food waste disposal and storage system 100, including, for example, the food loading station 102 with the feed table 104 and disposer 108, the pump 118, the storage tank 105, the controller 124, the user interface 328, etc. Further the provider of the monitoring and diagnostic service may monitor the food waste disposal and storage system 100 and schedule the collection times with the hauler, as appropriate. In this way, the owner or operator of the food facility does not need to make separate arrangements or payments for collection with the hauler or with an anaerobic digestion facility. Further, monies received from the anaerobic digestion facility could be credited towards the periodic subscription fee, paid to the owner or operator of the food facility, or paid to the provider of the monitoring and diagnostic service.

Figure 4:
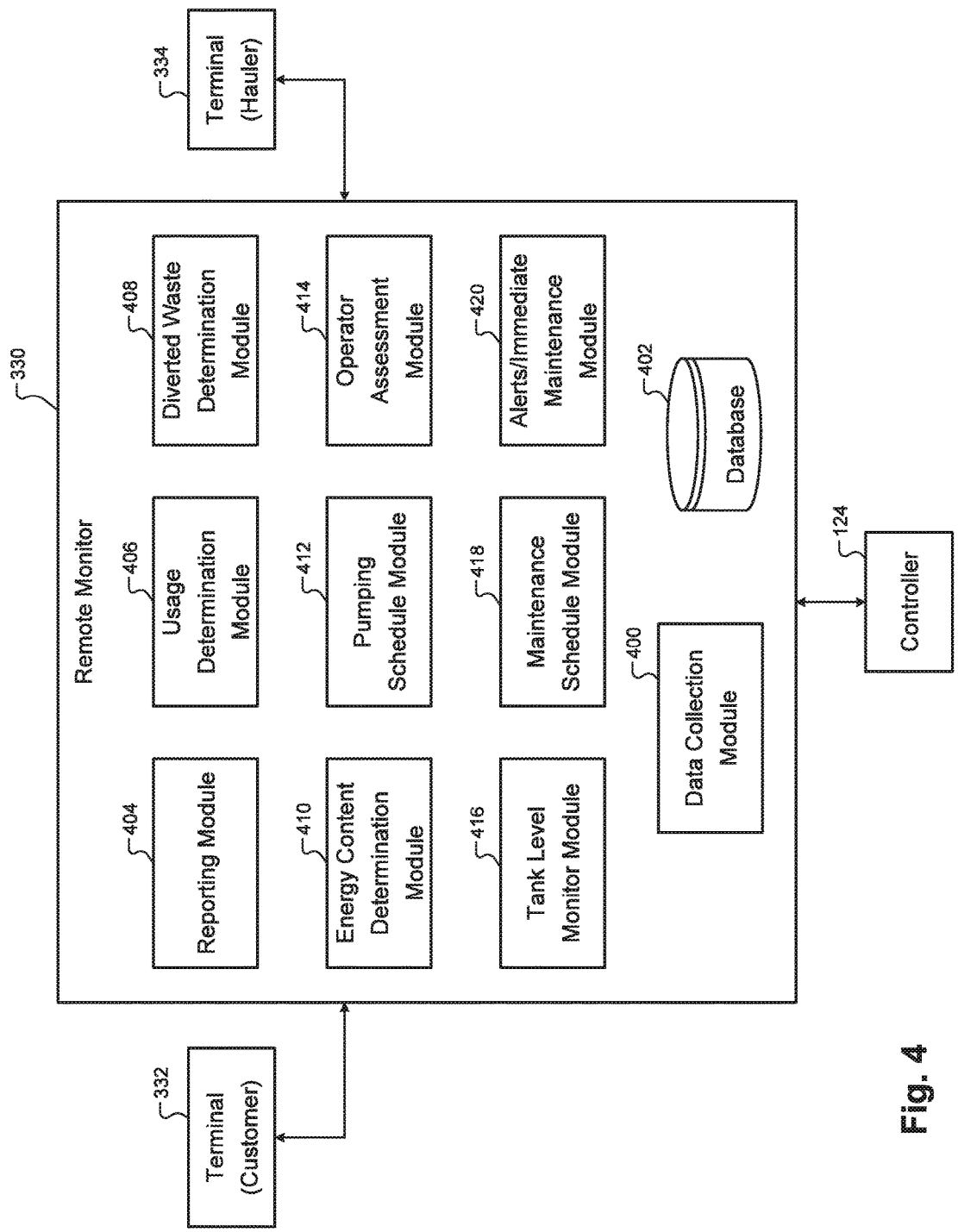
FIG. 4 is a block diagram of a remote monitor, controller, and terminals of the monitoring and diagnostics system of FIG. 3.

With reference to FIG. 4, further details are shown for the remote monitor 330. Specifically, the remote monitor 330 includes a data collection module 400 for operations and communication related to receiving sensed and calculated data from controller 124 associated with the food disposal and storage system 100. Additionally, the remote monitor 330 includes a database 402 stored in memory that includes received data from the controller 124 associated with the food disposal and storage system 100. The data collection module 400, for example, may receive operational data from the controller 124, including sensed and calculated data, and store the received data in the database 402. Because the remote monitor 330 can be in communication with multiple controllers 124 at multiple food disposal and storage systems 100, the data in the database 402 can be appropriately indexed with identifiers indicating the particular controller 124 and particular food disposal and storage system 100 associated with the received data.

Additionally, the remote monitor 330 includes a reporting module 404 for operations and communication related to generating and communicating reports, notifications, and alerts to the customer terminal 332 at a particular food disposal and storage system 100 and/or a hauler terminal 334 associated with a particular hauler. For example, as discussed in further detail below, the reporting module 404 can generate and communicate reports associated with usage data, food waste monitoring, diverted waste, environmental metrics, and energy content for a particular food disposal and storage system 100. Additionally, the reporting module 404 can report data to a customer terminal 332 for use by the customer terminal 332 in displaying a customer dashboard that includes data indicating system status and health metrics. For example, the reporting module 404 can report data for use by the customer terminal 332 for display in the customer dashboard, including the current pumping schedule, any operator assessment or oversight issues, the current tank level of the storage tank 105, a current maintenance schedule, and any alerts or notifications requiring, for example, immediate maintenance.

Additionally, the remote monitor 330 includes a usage determination module 406 for operations and communications related to determining usage data metrics associated with a particular food disposal and storage system 100. For example, as discussed in further detail below, the usage determination module can determine the particular water usage and costs, electricity usage and costs, run time, labor costs, and slurry volume, for example, associated with a particular food disposal and storage system 100.

Additionally, the remote monitor 330 includes a diverted waste determination module 408 for operations and communications related to determining an amount of food waste diverted away from the landfill, or other food waste destination, for a particular food disposal and storage system 100. Additionally, the remote monitor 330 includes an energy content determination module 410 for operations and communication related to determining an estimated energy content of food waste in the storage tank 105 or collected from the storage tank 105.

Additionally, the remote monitor 330 includes a pumping schedule module 412 for operations and communication related to determining and updating a current pumping schedule for the storage tank 105 of the food disposal and storage system 100.

Additionally, the remote monitor 330 includes an operator assessment module 414 for evaluating and assessing particular operators that have logged in and used the food disposal and storage system 100, as indicated by the login information received at the user interface 328. As discussed in further detail below, for example, the remote monitor 330 may determine whether an increased number of system faults or malfunctions have occurred during operations associated with a particular user. Additionally, the operator assessment module 414 can determine whether a particular user, for example, uses an increased amount of water during operations of the food disposal and storage system 100.

Additionally, the remote monitor 330 includes a tank level monitor module 416 for determining and monitoring a current tank level of the storage tank 105 at the food disposal and storage system 100, based on data received, for example, from the level sensor 320.

Additionally, the remote monitor 330 includes a maintenance schedule module 418 for operations and communication associated with determining whether any particular component of the food disposal and storage system 100 is in need of maintenance. Additionally, the maintenance schedule module 418 can predict, based on monitored operational data, whether a particular component of the food disposal and storage system 100 will be in need of maintenance in the near future.

Additionally, the remote monitor 330 includes an alerts/immediate maintenance module 420 for operations and communication associated with generating alerts or notifications indicating, for example, an emergency situation requiring immediate maintenance or assistance. For example, the alerts/immediate maintenance module 420 can generate alerts indicating that the storage tank 105 is full or near full, that the temperature in the storage tank 105 is too low or leaking, or that there is a clog or obstruction in the system, for example, at the pump discharge pipe.

Figure 5:
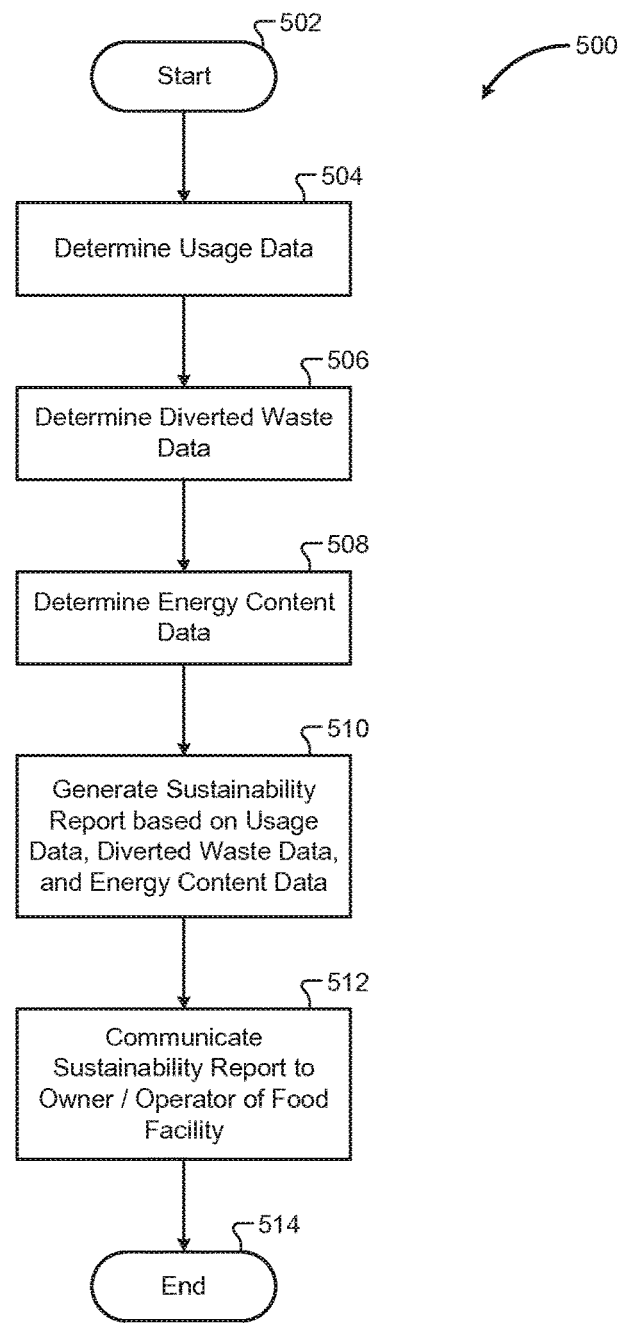
FIG. 5 is a flowchart depicting an example method for a food waste disposal, storage, and treatment system in accordance with an aspect of the present disclosure.

With reference to FIG. 5, a control algorithm 500 is shown for generating and communicating a sustainability report associated with a particular food disposal and storage system 100. The control algorithm 500 may be performed by the remote monitor 330 and in particular, by the reporting module 404 based on data generated or determined by the usage determination module 406, the diverted waste determination module 408, and the energy content determination module 410. The control algorithm 500 starts at 502. At 504, the usage determination module 406 of the remote monitor 330 determines usage data for the food disposal and storage system 100. For example, as discussed in further detail below, the usage data may include water usage data, electricity usage data, run time data, labor costs data, and slurry volume data. At 506, the diverted waste determination module 408 of the remote monitor 330 may determine diverted waste data associated with the food disposal and storage system 100. The diverted waste data, as discussed in further detail below, may include an amount of food waste diverted from a landfill or other food waste destination. The diverted waste data may also include an amount of greenhouse gas emissions reduced by diverting the food waste from the landfill. At 508, the energy content determination module 410 of the remote monitor 330 determines an energy content of the diverted waste associated with a particular food disposal and storage system 100. For example, the estimated energy content of diverted waste may indicate, for example, the estimated methane yield for the slurry mix currently stored in the storage tank 105 and/or the estimated energy equivalent in kilowatt hours for the slurry mix currently stored in the storage tank 105. At 510, the reporting module 404 of the remote monitor 330 generates the sustainability report based on the determined usage data, diverted waste data, and energy content data, as described above. At 512, the reporting module 404 of the remote monitor 330 communicates the sustainability report to the owner or operator of the particular food facility. For example, the reporting module 404 may communicate the sustainability report to the customer terminal 332 associated with the particular food facility. The control algorithm 500 ends at 514.

Figure 6:
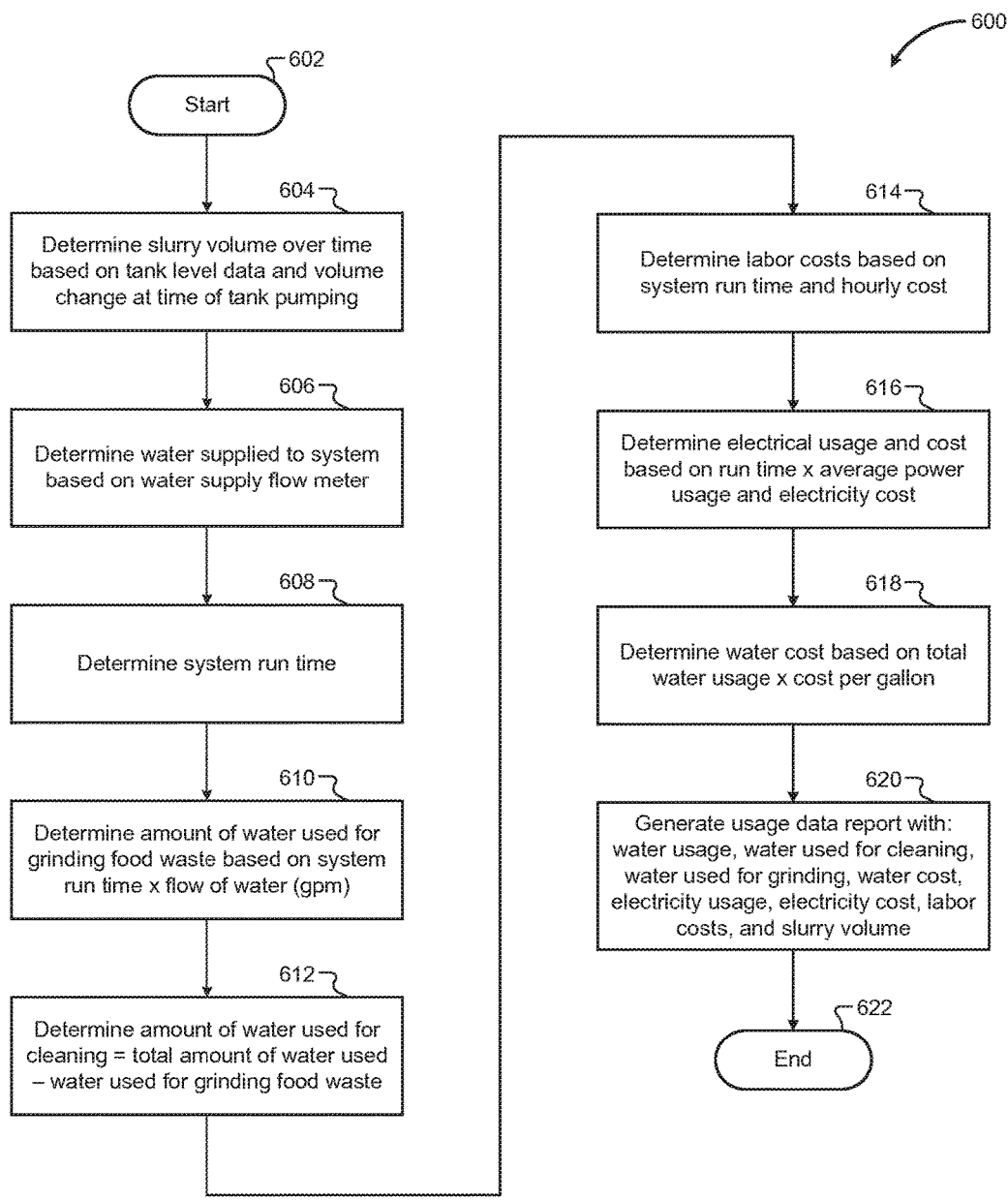
FIG. 6 is a flowchart depicting an example method for a food waste disposal, storage, and treatment system in accordance with an aspect of the present disclosure.

With reference to FIG. 6, a control algorithm 600 is shown for determining usage data for a food disposal and storage system 100. The control algorithm 600 and the functionality shown in FIG. 6 are encapsulated at block 504 of FIG. 5. The control algorithm 600 may be performed by the usage determination module 406 of the remote monitor 330. Generally, the usage data report indicates the use and associated costs of water, electricity, and labor, as well as the associated volume of slurry mix produced by a particular food disposal and storage system 100. The report can be cumulative over the entire life of the food disposal and storage system 100 or limited to a specific reporting time period. As discussed below, water usage can be divided between grinding water usage and cleaning water usage to help understand operational characteristics. Additionally, measured storage tank volume change can be compared to the reported slurry volume received by an anaerobic digestion facility.

With continued reference to FIG. 6, the control algorithm 600 starts at 602. At 604, the usage determination module 406 determines the slurry volume over time based on the tank level data generated by the level sensor 320 and the volume change at the time of storage tank pumping. At 606, the usage determination module 406 determines the total water supply to the system based on data received from the flow sensor 308a for the water supply 300. For example, the water supply data may include the total amount of water supplied to the feed table 104 and the disposer 108 and may be inclusive of all water introduced to the system, both for grinding food waste by the disposer 108 and for cleaning the feed table 104 and disposer 108. At 608, the usage determination module 406 determines the system run time for the designated time period at issue. At 610, the usage determination module 406 determines an amount of water used for grinding food wasted based on the system run time (as determined at step 608) multiplied by the flow of water in gallons per minute (gpm) for the water supply. At 612, the usage determination module 406 determines the amount of water used for cleaning by subtracting the amount of water used for grinding food waste (determined at step 610) from the total amount of water used by the system (determined at step 606). In this way, the usage determination module 406 is able to determine the amount of water used for grinding food waste as well as the amount of water used for cleaning the system.

At 614, the usage determination module 406 determines the labor costs associated with operating the food disposal and storage system 100 based on the total system run time, as indicated and logged by the controller 124, multiplied by the hourly cost of labor at the particular food facility. At 616, the usage determination module 406 determines the electrical usage of the system based on the total run time of the system multiplied by the average power usage of the system. Further, the usage determination module 406 determines the electricity cost based on the electrical usage in kilowatt hours multiplied by the cost in dollars per kilowatt hour. Alternatively, the usage determination module 406 may determine the electrical usage based on electrical data sensed by electrical sensors of the food disposal and storage system 100. For example, the electrical usage may be based on electrical current data sensed by current sensors 306 of the food disposal and storage system 100.

At 618, the usage determination module 406 determines the water cost based on the determined total water usage (determined at step 606) multiplied by the cost of water per gallon.

At 620, the usage determination module 406 generates a usage data report indicating, for example, total water usage, water used for cleaning, water used for grinding food waste, the water cost, electrical usage, electrical cost, labor cost, and slurry volume produced.

Figure 7:
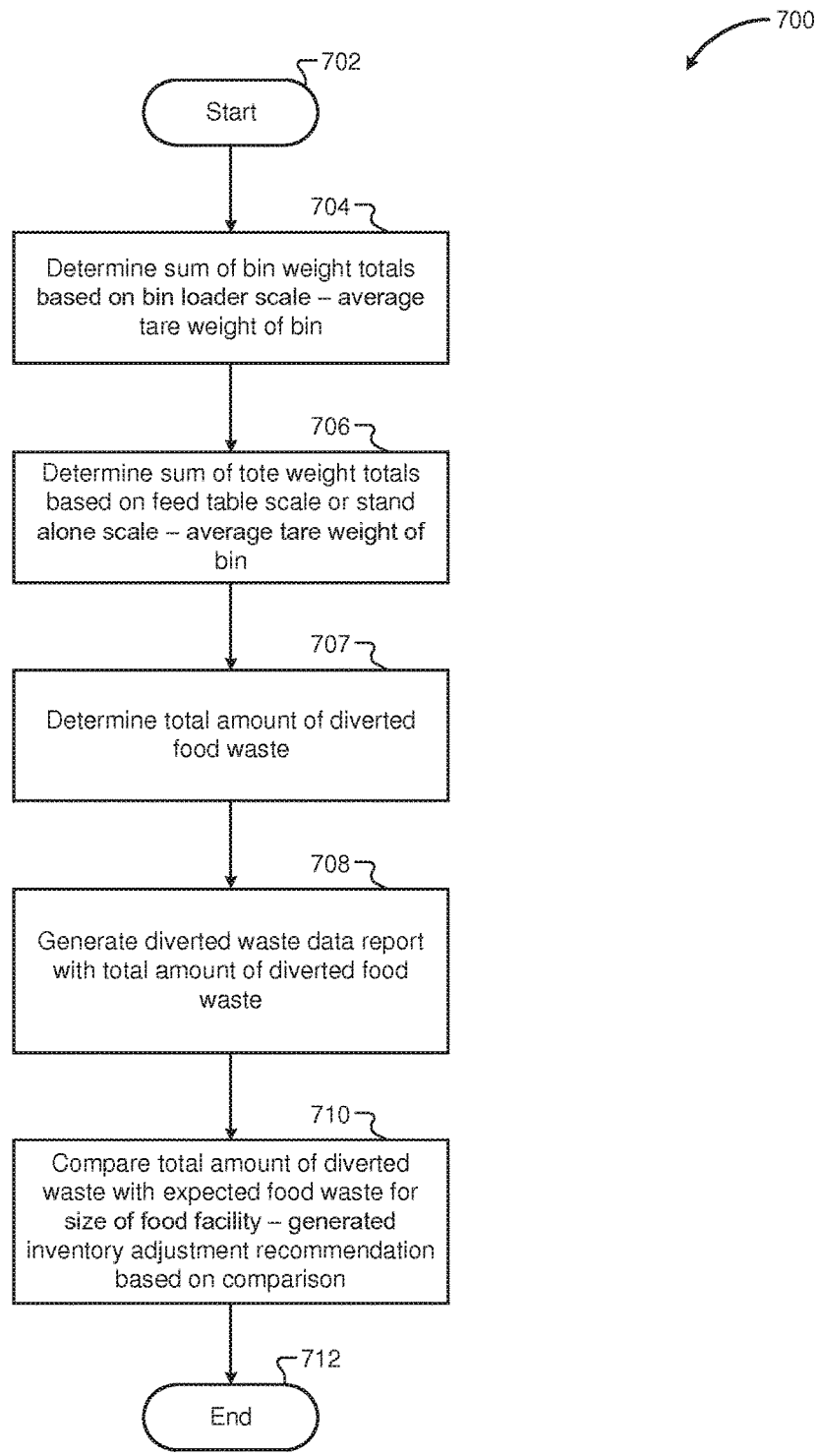
FIG. 7 is a flowchart depicting an example method for a food waste disposal, storage, and treatment system in accordance with an aspect of the present disclosure.

With reference to FIG. 7, a control algorithm 700 is shown for generating a diverted waste report indicating the weight of food waste diverted from the landfill or other food waste destination by the food disposal and storage system 100. The control algorithm 700 and the functionality shown in FIG. 7 are encapsulated at block 506 of FIG. 5. The food waste weight is obtained from load cells or scales at the food facility. For example, as discussed above, the bin loader 112 may include scale 324a and/or the feed table 104 may include scale 324b. Additionally or alternatively, a standalone scale 324c may be used for weighing the food waste introduced into the food disposal and storage system 100. The diverted waste report can include data for the total cumulative amount of food waste diverted over the life of the food disposal and storage system 100, or over a specific designated reporting period, such as monthly, quarterly, annually, etc. Additionally, the amount of diverted food waste can be compared with an expected amount of food waste for the size of the particular food facility to determine if there are any inventory management issues. For example, a food facility maintaining an excessive inventory of food may consequently generate an excessive, i.e., above average, amount of food waste.

The control algorithm 700 may be performed by the diverted waste determination module 408 of the remote monitor 330 and starts at 702. At 704, the diverted waste determination module 408 determines the sum of the bin weight totals based on the bin loader scale 324a and subtracts the known average tare weight of an empty bin. In this way, the diverted waste determination module 408 determines the amount of food waste loaded into the bin loader 112. At 706, the diverted waste determination module 408 determines the sum of the tote weight totals based on the feed table scale 324b or the standalone scale 324c and subtracts the known average tare weight of an empty bin. In this way, the diverted waste determination module 408 determines the total amount of food waste introduced into the system at the feed table 104. Although the use of three scales 324a, 324b, and 324c, are discussed, it is understood that a particular food disposal and storage system 100 may include only one or two scales or may include additional scales. In such case, steps 704 and/or 706 may be performed as appropriate, based on the types of scales 324a, 324b, 324c present in the system.

At 707, the diverted waste determination module 408 determines the total amount of diverted food waste, based on the previous determinations at steps 704 and/or 706. Additionally, the diverted waste determination module 408 may determine a total amount of greenhouse gas emission reduction based on the diverted food waste. At 708, the diverted waste determination module 408 generates a diverted waste data report with a total amount of diverted waste, as calculated above. The diverted waste data report may also include the greenhouse gas emission reduction, as calculated above.

At 710, the diverted waste determination module 708 compares the total amount of diverted waste with an expected amount of food waste, calculated based on the size of the food facility associated with the food disposal and storage system 100. At 710, when the total amount of diverted waste is greater than the expected amount of food waste, the remote monitor 330 can generate an inventory adjustment recommendation indicating that the amount of food inventory may be greater than needed, based on the higher than normal amount of food waste being generated at the facility. The control algorithm 700 ends at 712.

Figure 8:
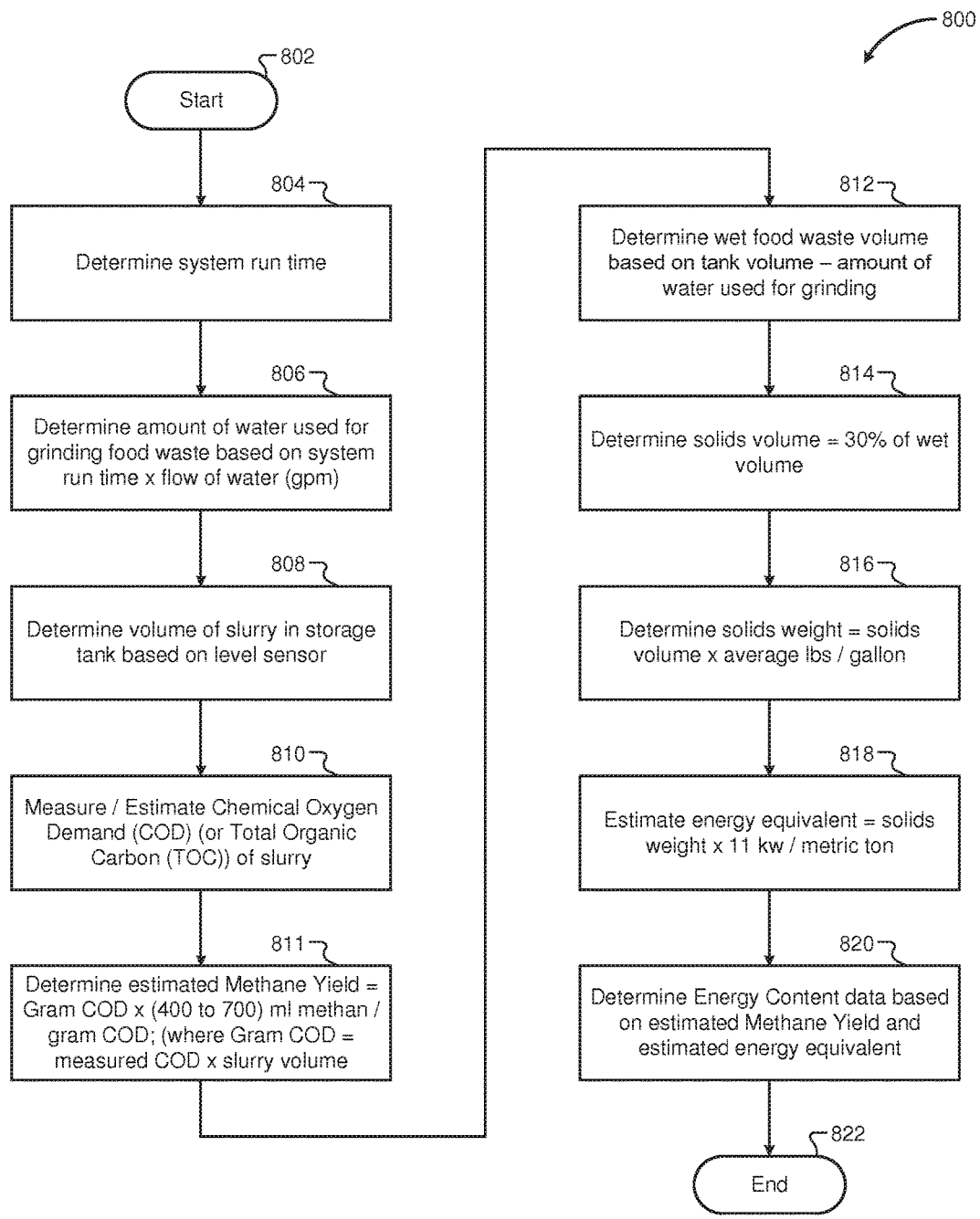
FIG. 8 is a flowchart depicting an example method for a food waste disposal, storage, and treatment system in accordance with an aspect of the present disclosure.

With reference to FIG. 8, a control algorithm 800 is shown for determining the estimated energy content for the diverted food waste stored in the storage tank 105 of a particular food disposal and storage system 100. The control algorithm 800 and the functionality shown in FIG. 8 are encapsulated at block 508 of FIG. 5. The energy content can be an approximation of the potential energy that can be generated in the anaerobic digestion by the slurry mix stored in the storage tank 105. For example, one method for approximating energy content includes estimating or measuring the chemical oxygen demand (COD) or the total organic carbon (TOC) of the slurry mix, along with the volume of the slurry mix, and approximating the expected methane yield to be generated during the anaerobic digestion process based on the measurement(s) or estimates. The estimates or measurements can be made either at the storage tank 105, for example, at the time of collection of the slurry mix, at the anaerobic digestion facility when the slurry mix is deposited, and/or at the discharge of the disposer, for example at the disposer discharge pipe 116. A second method includes estimating the energy content of the slurry in terms of kilowatt hours. For example, the amount of dry food waste solids in the slurry mix can be estimated and the energy content of the slurry in terms of kilowatt hours can be estimated based on the estimated amount of the dry food waste solids in the slurry mix. Based on the estimated energy content, various environmental metrics can be reported to the customer, including, for example, that the projected energy generated could: power X homes per month; provide enough natural gas to heat X homes per month; remove X tons of $CO_2$; take X cars off the road; create enough fertilizer for X football fields; provide a carbon credit of X, etc. The system, for example, can determine the mass loading rate of food waste slurry to the storage tank 105 over time using the change in tank volume in known ranges of total solid content for food waste. Additionally, using known decay rates of COD or TOC, the energy value of the final product, i.e. the slurry mix taken to the anaerobic digester, can be calculated. That value can be used for reporting total energy produced over time or to calculate energy equivalents.

The control algorithm 800 can be performed by the energy content determination module 410 of the remote monitor 330 and starts at 802. At 804, the energy content determination module 410 determines the system run time, i.e. the amount of time that the disposer 108 was grinding food waste. At 806, the energy content determination module 410 determines the amount of water used for grinding food waste based on the total system run time and the flow of water in gallons per minute of the water supply 300. At 808, the energy content determination module 410 determines the volume of the slurry mix in the storage tank 105 based on the level sensor 320.

At 810, the COD or TOC of the slurry mix in the storage tank is measured or estimated. For example, the COD or TOC can be measured or estimated at the time of collection of the slurry mix from the storage tank 105. Alternatively, the COD or TOC can be estimated based on the time since the last collection from the storage tank and the estimated fill rate of food waste into the storage tank 105. Further, the COD or TOC can be estimated based on the types of food waste included in the slurry along with known COD or TOC values or estimates for specific food waste types. Additionally, or alternatively, appropriate sensors can be installed at the storage tank 105 to measure COD or TOC of the slurry mix or other parameters used to estimate the COD or TOC of the slurry mix. Further, the collection truck 204 may be equipped with appropriate measurement tools or sensors, and/or an operator of the collection truck 204 may carry or have access to appropriate measurement tools or sensors to measure or estimate the COD or TOC of the slurry mix or other parameters used to estimate the COD or TOC of the slurry mix.

As discussed above, measurements or estimates for the TOC and/or for the COD of the slurry mix can be used in estimating the energy content of the slurry mix in the storage tank 105. For example, TOC or COD can be used individually in estimating the energy content. Alternatively, both TOC and COD can be used in estimated the energy content. For example, the energy content can be estimated based on TOC and based on COD and the different energy content estimates can then be compared, combined, averaged, etc. As between TOC and COD, in some installations the COD of the slurry mix in the storage tank 105 may decrease from the initial grinding to the pump out of the slurry mix from the storage tank, while the TOC may remain more constant. In other words, while the slurry mix is stored in the storage tank 105, the COD of the slurry mix may decrease more quickly than the TOD of the slurry mix. For example, as complex Organics decrease there may still be carbon in the form of shorter chain volatile fatty acids (VFA) for conversion to methane. At the same time, there may be less COD because the compounds have already used some oxygen in the process of being converted to VFAs. In this way, utilizing the TOC for estimating the energy content of the slurry mix in the storage tank 105 may provide a more accurate energy content estimate than COD, given that the COD may decrease as the slurry mix is stored in the storage tank 105 over time, which could result in underestimating the energy content of the slurry mix in the storage tank 105. In other words, energy content estimates based solely on COD may provide a lower estimate for the energy content of a slurry mix that has been stored in the storage tank for a period of time, while energy content estimates based on TOC may provide a more accurate estimate for the energy content of the slurry mix due to the TOC remaining more stable and constant as the slurry mix remains in the storage tank 105 over time.

At 811, the estimated methane yield is determined based on the measurements obtained at step 810. For example, the estimated methane yield may be determined as the gram COD multiplied by (400 to 700) milliliters of methane per gram COD, where the gram COD equals the measured COD multiplied by the slurry volume. As such, the estimated methane yield can be reported and included in an energy report to indicate the estimated amount of methane that could be generated by the slurry mix at an anaerobic digestion facility.

At 812, the energy content determination module 410 determines the wet food waste volume based on the current volume of the slurry mix in the tank (as indicated at step 808 above) by subtracting the amount of water used for grinding food waste (as indicated at step 806 above). At step 814, the energy content determination module 410 determines the volume of food waste solids present in the slurry mix based on, for example, an estimate of 30% of the wet food waste volume. At 816, the energy content determination module 410 determines the solids weight as the solids volume multiplied by a predetermined average pounds per gallon. At 818, the energy content determination module 410 estimates the energy equivalent of the food waste solids as the solids weight multiplied by, for example, 11 kilowatt hours per metric ton. At 820, the energy content determination module 410 determines the energy content data based on the estimated methane yield determined at step 811 above and based on the estimated energy equivalent based on step 818 above.

Further, based on the estimated yield and estimated energy equivalent, the energy content determination module 410 may then determine additional environmental metrics including, for example, data indicating that the estimated energy content of the slurry mix could: provide enough electricity for X homes per month; provide enough natural gas to heat X homes per month; remove X tons of $CO_2$ equivalent; take X cars off the road; create enough fertilizer for X football fields; or result in a specific carbon credit.

Figure 9:
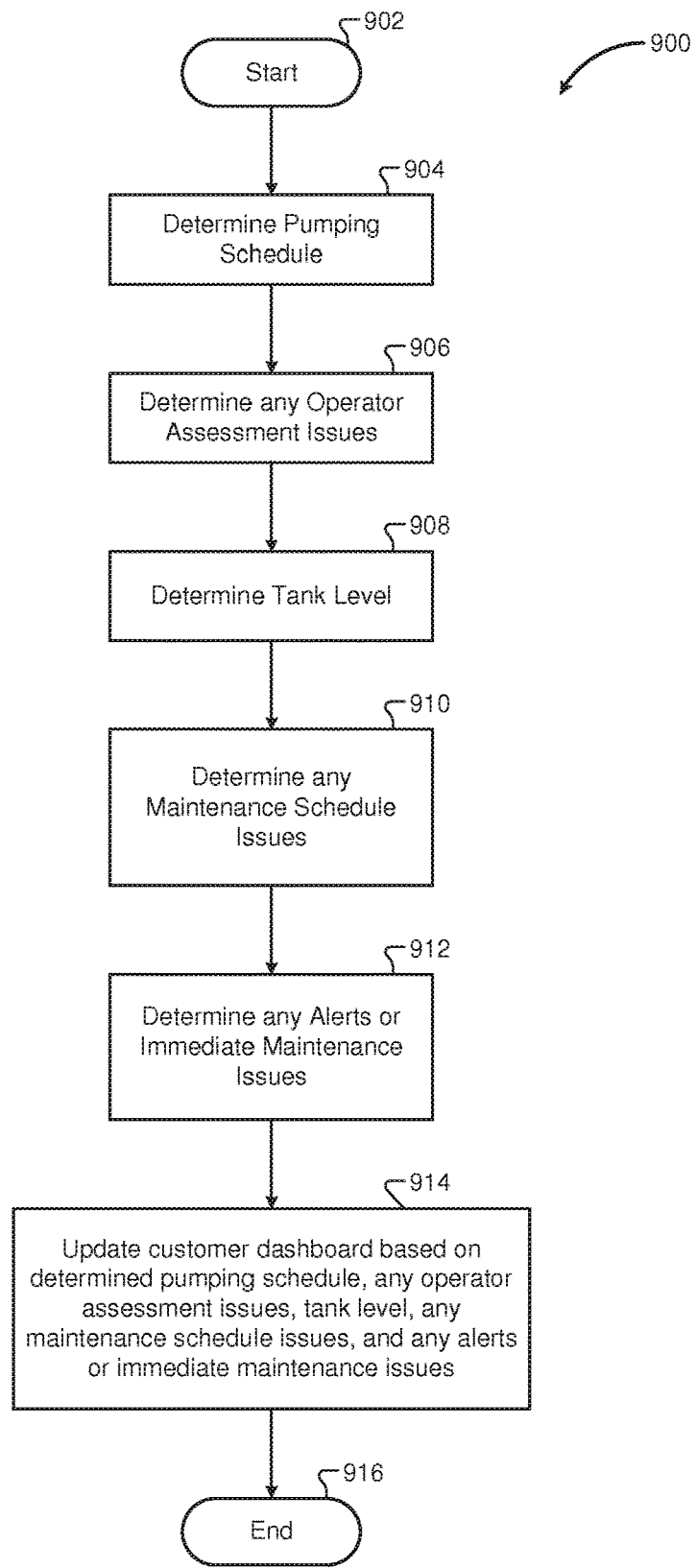
FIG. 9 is a flowchart depicting an example method for a food waste disposal, storage, and treatment system in accordance with an aspect of the present disclosure.

With reference to FIG. 9, a control algorithm 900 is shown for updating a customer dashboard of the customer terminal 332 associated with the food waste disposal and storage system 100 at a particular food facility. The customer dashboard of the customer terminal 332, for example, may be generated by a standalone software application running on the customer terminal 332 that is configured to allow communication with the remote monitor 330 such that the customer dashboard is continually or periodically updated with information from the remote monitor 330 regarding the food disposal and storage system 100. Alternatively, the customer dashboard may reside within a web browser interface whereby the web browser interface is continually or periodically updated or populated with information from the remote monitor 330 regarding the food disposal and storage system 100. In this way, the customer dashboard may provide a customer user with information about the food disposal and storage system 100, including various recommendations, status, and maintenance information. Additionally, the customer dashboard may receive data from a customer user for communication to the remote monitor 330 and/or for communication ultimately to the controller 124 or user interface 328.

The control algorithm 900 may be performed by, for example, the reporting module 404 of the remote monitor 330 based on data generated by other modules of the remote monitor 330, including, for example, the pumping schedule module 412, the operator assessment module 414, the tank level monitor module 416, the maintenance schedule module 418, and the alerts/immediate maintenance module 420.

The control algorithm starts at 902. At 904, the current pumping schedule for the storage tank 105 is received by the reporting module 404, as determined by the pumping schedule module 412, described in further detail below. At 906, any operator assessment issues are received by the reporting module 404, based on the determination of any operator assessment issues by the operator assessment module 414, described in further detail below. At 908, the current tank level of the storage tank 105 is received by the reporting module 404, as determined by the tank level monitor module 416, as described in further detail below. At 910, the reporting module 404 receives any maintenance scheduling issues, as determined by the maintenance schedule module 418, as described in further detail below. At 912, the reporting module 404 receives any alerts or immediate maintenance issues, as determined by the alerts/immediate maintenance module 420, described in further detail below.

At 914, the reporting module 404 updates the customer dashboard of the customer terminal 332 based on the determined pumping schedule, any operator assessment issues, tank level, any maintenance schedule issues, and any alerts or immediate maintenance issues. In this way, the remote monitor 330 may continually update the customer dashboard or portal of the customer terminal 332 to provide the customer with up-to-date information regarding the status of the food disposal and storage system 100. In this way, the customer using the customer terminal 332, at a glance, can view up-to-date information with respect to the current pumping schedule, any operator assessment issues, the current tank level of the storage tank 105, any maintenance scheduling issues, and any alerts or immediate maintenance issues. The control algorithm 900 ends at 916.

Figure 10:
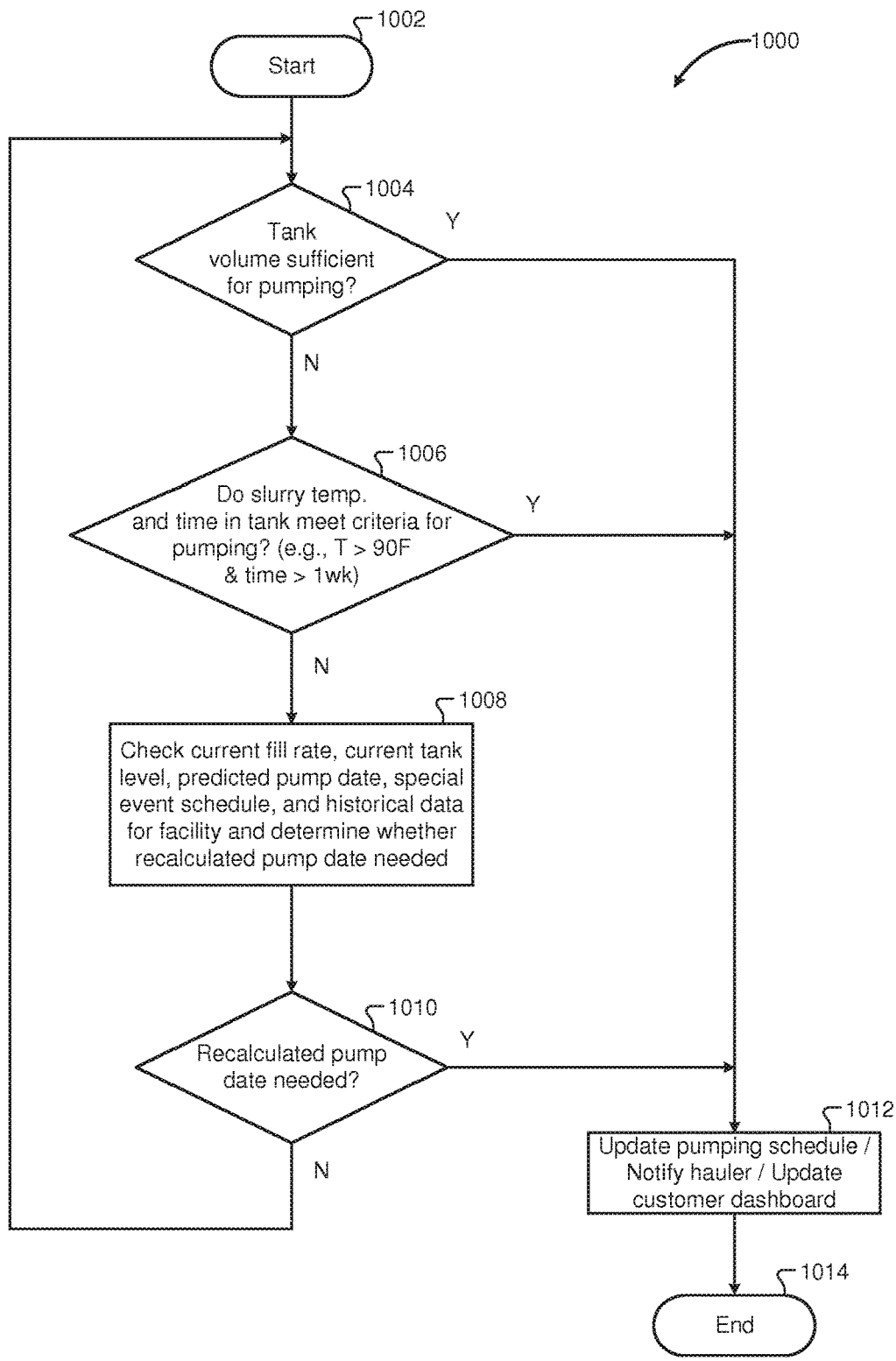
FIG. 10 is a flowchart depicting an example method for a food waste disposal, storage, and treatment system in accordance with an aspect of the present disclosure.

With reference to FIG. 10, a control algorithm 1000 is shown for determining a pumping schedule of the storage tank 105 at the food disposal and storage system 100. The control algorithm 1000 may be performed by the pumping schedule module 412 of the remote monitor 330. The control algorithm 1000 and functionality shown in FIG. 10 are encapsulated at block 904 of FIG. 9.

A number of considerations are addressed for scheduling pumping of the storage tank 105. For example, the chemistry attributes of the slurry mix in the storage tank 105 can be reviewed to determine whether they are suitable for a particular or intended use such that the volume in the tank makes it cost effective for pumping. For example, an end user of the slurry mix in the storage tank 105, such as particular anaerobic digestion facilities, may require or desire a slurry mix with a particular chemical composition. As described in further detail below, the chemical attributes of the slurry mix can be measured and reviewed to determine whether additives may be required and/or to determine the optimized pumping scheduling for the storage tank 105. Further, ambient temperature and time in the storage tank 105 may cause the slurry mix in the storage tank to start to decompose faster than desired. As such, a pumping schedule may account for ambient temperature and the length of time that the slurry mix has been in the storage tank 105. Further, the pumping schedule module 412 may determine the current fill rate of the storage tank 105 and predict when the storage tank 105 will be full or close to full for optimized pumping scheduling.

Additionally, the food facility schedule may be considered to determine whether any special events or special circumstances may require adjustment of the pumping schedule. For example, if the food facility anticipates a special event that may generate a higher than usual volume of food waste (e.g., conferences, weddings, graduations, other events, etc.) the pumping schedule module 412 can review the current tank level, the usual fill rate, and the anticipated increased fill rate due to the special event to determine whether the pumping schedule needs to be adjusted and whether the storage tank 105 should be pumped prior to the special event. In this way, the pumping schedule can account for anticipated increased usage of the food disposal and storage system 100 due to such special event scheduling.

Additionally, the pumping schedule can be coordinated over multiple sites. For example, if a particular customer has multiple sites and multiple food facilities with a food disposal and storage system 100, the pumping schedule module 412 can consider the pumping needs at each of the different locations, as well as the distances between each of the locations, to determine an optimized pumping schedule across all sites and food facilities. In this way, the pumping schedule module 412 can optimize the slurry mix composition for particular intended uses, while minimizing pumping costs. Further, as discussed above, the current pumping schedule and current storage tank level can be continually reported and updated on the customer's dashboard at the customer terminal 332.

With continued reference to FIG. 10, the control algorithm 1000 starts at 1002. At 1004, the pumping schedule module 412 determines whether the current tank volume of the storage tank 105 is sufficient for pumping. For example, if the storage tank 105 is full or close to full, the current storage tank volume may be sufficient for pumping. In such case, the pumping schedule module 412 proceeds to 1012 to update the pumping schedule, notify the hauler at the hauler terminal 334, and update the customer dashboard at the customer terminal 332. At 1004, when the current tank volume is not sufficient for pumping, the pumping schedule module 412 proceeds to 1006. At 1006, the pumping schedule module 412 determines whether the current slurry temperature and time in the tank meet the criteria for pumping. For example, if the current tank volume is not near full, but the time the slurry has been stored in the storage tank 105 is greater than one week and/or the temperature of the slurry mix has been greater than 90° Fahrenheit, for example, the pumping schedule module 412 may proceed to 1012 and revise the pumping schedule to provide for a sooner than normal pumping date. Again, the pumping schedule module 412 would update the pumping schedule, notify the hauler at hauler terminal 334, and update the customer dashboard at customer terminal 332. At 1006, when the slurry temperature and time in the storage tank 105 do not meet the criteria for pumping, the pumping schedule module 412 proceeds to 1008.

At 1008, the pumping schedule module checks the current fill rate, the current tank level of the storage tank 105, the current predicted pump date, special event scheduling, and historical data for the facility, to determine whether a recalculated pump date is needed. As such, the pumping schedule module 412 can predict a current pump date based on the historical data and normal fill rates, and then determine whether an adjustment to the normal pumping date is needed based on any special event scheduling or other activities. For example, the pumping schedule module 412 may determine, based on historical data, that a particular week, weekend, or month, is generally associated with a greater than normal, or less than normal, amount of food waste generated. As such, the pumping schedule module 412 can make appropriate adjustments to the pumping schedule. At 1010, the pumping schedule module 412 determines whether a recalculated pump date is needed. If so, the pumping schedule module 412 proceeds to 1012 to update the pumping schedule, notify the hauler at hauler terminal 334, and update the customer dashboard at customer terminal 332. When a recalculated pump date is not needed at 1010, the pumping schedule module 412 loops back to step 1004 above. The control algorithm 1000 ends at 1014.

Figure 11:
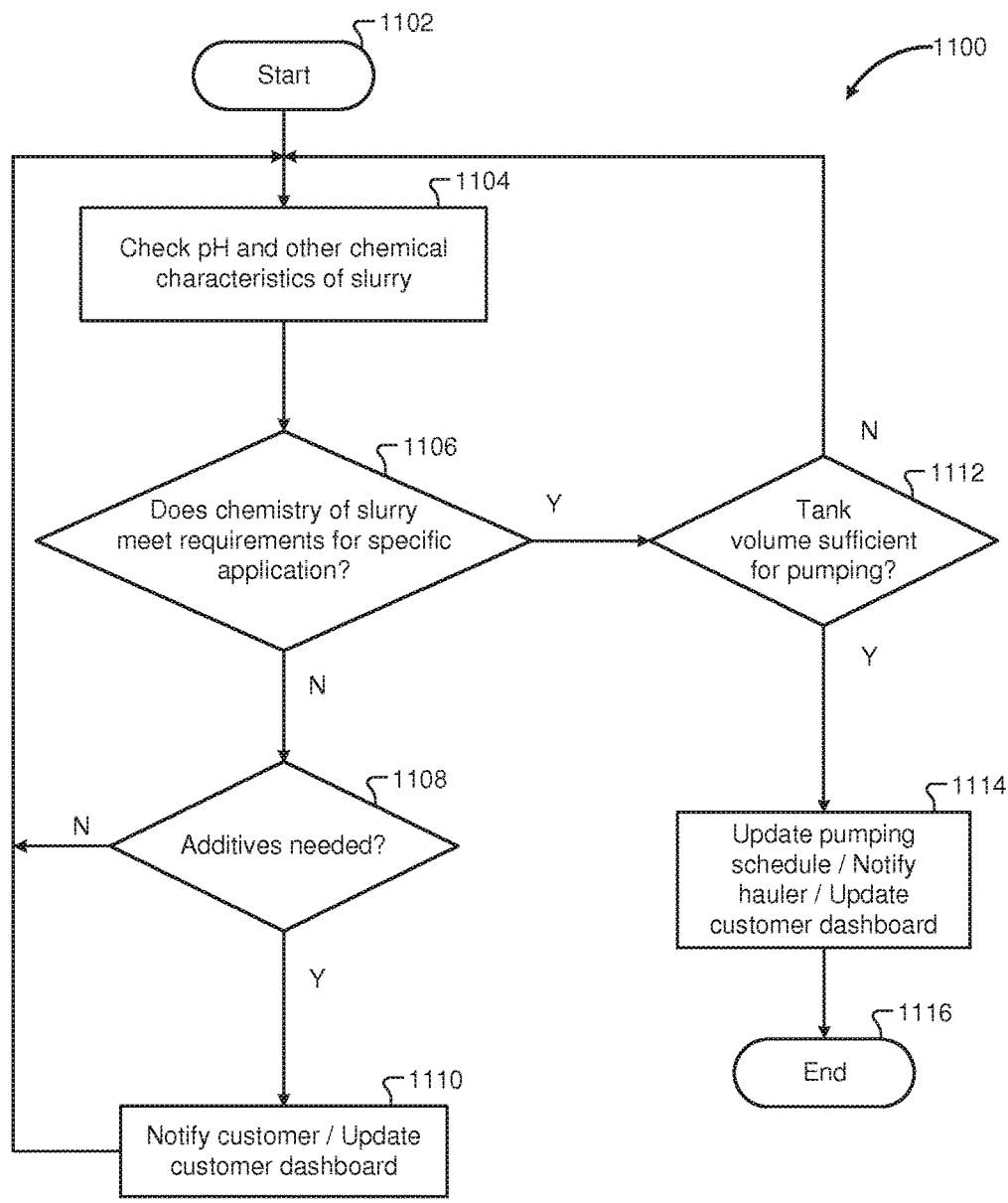
FIG. 11 is a flowchart depicting an example method for a food waste disposal, storage, and treatment system in accordance with an aspect of the present disclosure.

With reference to FIG. 11, a control algorithm 1100 is shown for determining the pumping schedule and introduction of additives so that the chemical composition of the slurry mix in the storage tank 105 meets a target chemical composition. For example, the additives may include chemicals to control the pH of the slurry mix. Further, the additives may include biological agents introduced into the slurry mix to modify the chemical composition of the slurry mix. The control algorithm 1100 may be performed by the pumping schedule module 412 of the remote monitor 330. The control algorithm 1100 and the functionality shown in FIG. 11 are encapsulated at block 904 of FIG. 9. The control algorithm 1100 starts at 1102. At 1104, the pumping schedule module 412 checks the pH and other chemical characteristics of the slurry mix in the storage tank 105. For example, the pumping schedule module 412 may obtain pH data from the pH sensor 316 and/or other chemical composition data of the slurry mix from the other chemical composition sensors 318. At 1106, the pumping schedule module 412 determines whether the chemistry of the slurry mix meets the requirements for a specific application by comparing the pH and/or other chemical characteristics of the slurry mix with a predefined slurry chemistry specification. For example, a predetermined chemical composition specification may indicate that the target chemical composition for the slurry mix should be: food waste slurry of finely ground food waste, no particles of which are larger than a half inch, mixed with water to a final consistency in the range of 8% to 15% total solids, greater than 90% volatile solids, a pH in the range of 4.0 to 10.0, a specific gravity of 0.95 to 1.10, Chemical Oxygen Demand of 70,000 to 200,000 milligrams per liter, Total Organic Carbon greater than 9,000 milligrams per liter, Total Kjeldahal Nitrogen less than 7,500 milligrams per liter, and represented by the general stoichiometric formula $C_{21.53}H_{34.21}O_{12.66}N$. As another example, the predetermined chemical composition specification may indicate that the target chemical composition for the slurry mix should be: food waste slurry of finely ground food waste, no particles of which are larger than a half inch, mixed with water to a final consistency in the range of 8% to 15% total solids, greater than 90% volatile solids, a pH in the range of 4.0 to 10.0, a specific gravity of 0.95 to 1.10, Chemical Oxygen Demand of 70,000 to 200,000 milligrams per liter, Total Organic Carbon greater than 40,000 milligrams per liter, Total Kjeldahal Nitrogen less than 7,500 milligrams per liter, and represented by the general stoichiometric formula $C_{21.53}H_{34.21}O_{12.66}N$.

At 1106, when the chemical composition of the slurry mix does not meet the requirements for a specific application, the pumping schedule module 412 proceeds to 1108. At 1108, the pumping schedule module 412 determines whether any additives are needed. For example, the pumping schedule module 412 may determine, based on the current chemical composition of the slurry mix, whether additional chemicals can be added to the slurry mix to assist in reaching the target chemical composition. At 1108, when additional additives are not needed, the pumping schedule module 412 loops back to 1104. At 1108, when additional additives are needed, the pumping schedule module 412 proceeds to 1110 to notify the customer and update the customer dashboard that additives should be introduced to the slurry mix in the storage tank 105.

With reference again to 1106 of FIG. 11, when the chemical composition of the slurry mix does meet the requirements for a specific target composition, the pumping schedule module 412 proceeds to 1112 to determine whether the tank volume is sufficient for pumping. When the tank volume is not sufficient for pumping, the pumping schedule module 412 loops back to 1104. When at 1112, the tank volume is sufficient for pumping, the pumping schedule module 412 proceeds to 1114 and updates the current pumping schedule, notifies the hauler at hauler terminal 334, and updates the customer dashboard at the customer terminal 332. The control algorithm 1100 ends at 1116.

Figure 12:
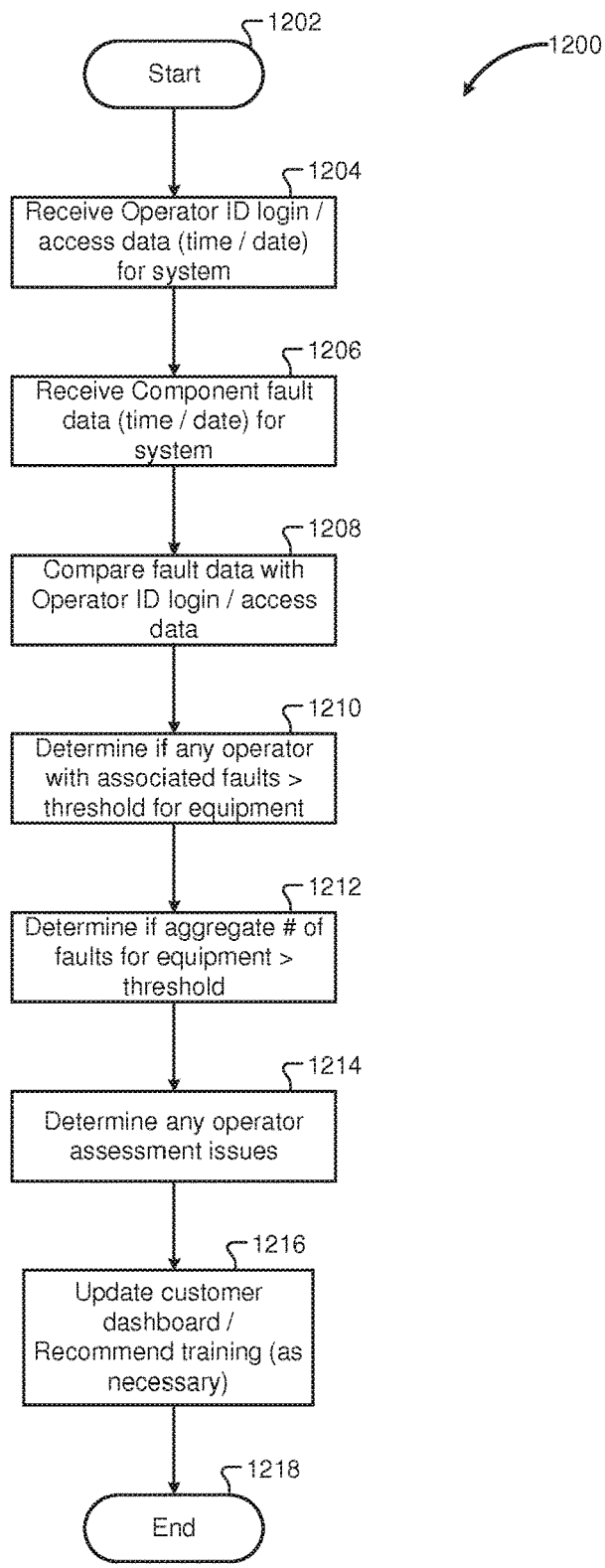
FIG. 12 is a flowchart depicting an example method for a food waste disposal, storage, and treatment system in accordance with an aspect of the present disclosure.

With reference to FIG. 12, a control algorithm 1200 is shown for identifying any operator assessment issues associated with particular operators of the equipment of the food disposal and storage system 100. The control algorithm 1200 may be performed by the operator assessment module 414 of the remote monitor 330. The control algorithm 1200 and the functionality shown in FIG. 12 are encapsulated at block 906 of FIG. 9. The control algorithm 1200 can provide information on usage and operator issues that may indicate the need for additional training. For example, the operator assessment module 414 may determine whether a particular operator is associated with particular equipment faults or malfunctions or whether the operating staff in general triggers a greater than normal number of equipment faults or malfunctions. As such, additional training for a particular operator or for the operating staff in general can be recommended to the customer. Particular faults or malfunctions of the equipment may include, for example, overloading the lifting equipment, excessive pipe blockages, issues associated with specific usage periods, and issues with the disposer 108 jamming or the pump 118 overheating or clogging.

The control algorithm 1200 starts at 1202. At 1204, the operator assessment module 414 receives operator identification login and usage/access data, including date and time, for the food disposal and storage system 100. For example, the operator assessment module 414 may receive a log of operator login and usage/access data indicating when particular operators were operating the equipment. At 1206, the operator assessment module 414 receives component fault data, including date and time, for the food disposal and storage system 100. For example, the operator assessment module 414 may receive a log of fault or malfunctions including the type of fault or malfunction and the date and time of the particular fault or malfunction. At 1208, the operator assessment module 414 may compare the fault data with the operator ID login data. At 1210, the operator assessment module 414 determines whether any particular operator is associated with a number of faults that is greater than a particular threshold for the equipment. For example, the operator assessment module 414 may determine whether a particular operator has jammed the disposer 108 or overloaded the bin loader 112 more than a certain number of times in a given period, for example, over one week or one month. Additionally, at 1212, the operator assessment module 414 determines whether the aggregate number of fault or malfunctions for a particular piece of equipment is greater than a particular threshold, across all operators of the equipment. As such, the operator assessment module 414 can determine whether additional training is needed for a particular user or for all of the users in general. Specifically, at 1214, the operator assessment module 414 determines whether there are any operator assessment issues, including the need for additional training for a particular operator or for particular training on a particular piece of equipment for all operators. At 1216, the operator assessment module 414 and the reporting module 404 update the customer dashboard at the customer terminal 332 to recommend any necessary training for particular operators or for operators in general of the equipment. The control algorithm 1200 ends at 1218.

Figure 13:
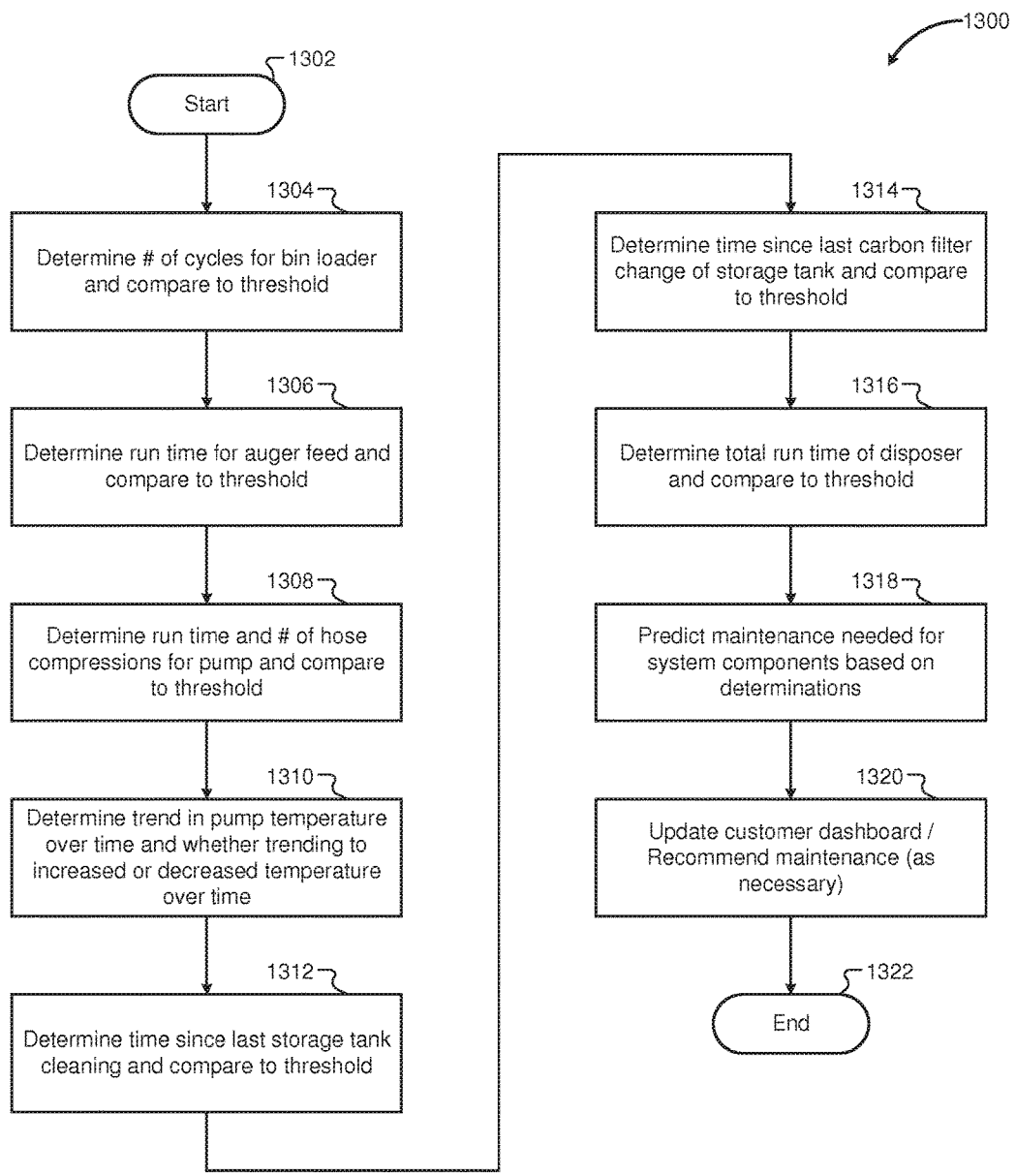
FIG. 13 is a flowchart depicting an example method for a food waste disposal, storage, and treatment system in accordance with an aspect of the present disclosure.

With reference to FIG. 13, a control algorithm 1300 is shown for determining any maintenance schedule issues. The control algorithm 1300 is performed by the maintenance schedule module 418. The control algorithm 1300 and the functionality shown in FIG. 13 are encapsulated at block 910 of FIG. 9. For example, the maintenance schedule module 418 can monitor equipment usage to alert the customer when routine maintenance is required. Additionally, the maintenance schedule module 418 can monitor run time as well as trending of physical characteristics to determine whether maintenance of the equipment is needed or will be needed in the near future. Additionally, the remote monitor 330 can generate an alert to notify the customer and/or a repair man or service agency of the need for maintenance.

The control algorithm 1300 starts at 1302. At 1304, the maintenance schedule module 418 determines the number of cycles for the bin loader 112 and compares the number of cycles to a predetermined threshold. At 1306, the maintenance schedule module 418 determines the run time for the auger feeder, if present, and compares the run time to a predetermined threshold. At 1308, the maintenance schedule module 418 determines the run time and number of hose compressions for the pump 118 and compares the run time and number of hose compressions to predetermined thresholds. At 1310, the maintenance schedule module 418 determines whether there is a trend in the pump temperature over time and whether the trending is toward an increased or a decreased temperature over time. For example, an increased or decreased temperature of the pump, over time, can indicate that the pump 118 is in need of repair or replacement.

At 1312, the maintenance schedule module 418 can determine whether the time since the last storage tank cleaning is greater than a predetermined threshold. For example, if it has been more than a predetermined time period, for example two months or three months, since the storage tank was last cleaned, the maintenance schedule module 418 can recommend that the storage tank 105 be cleaned. At 1314, the maintenance schedule module 418 can determine the time since the carbon filter of the storage tank 105 was last changed and compare the time to a threshold time period. For example, the storage tank 105 may include a carbon filter positioned in an exhaust tube of the storage tank to prevent odors from escaping the storage tank 105. If it has been longer than a predetermined time period since the last carbon filter changing, the maintenance schedule module 418 can recommend that the carbon filter be changed. At 1316, the maintenance schedule module 418 can determine the total run time of the disposer 108 and compare the total run time to a threshold. If the total run time is greater than the predetermined threshold, the disposer 108 may require maintenance and the maintenance schedule module 418 can recommend such maintenance. At 1318, based on the previous determination from steps 1304 through 1316, the maintenance schedule module 418 can predict maintenance needed for particular system components. At 1320, the maintenance schedule module 418 and the reporting module 404 can update the customer dashboard of the customer terminal 332 to recommend particular maintenance, as necessary. The control algorithm 1300 ends at 1322.

Figure 14:
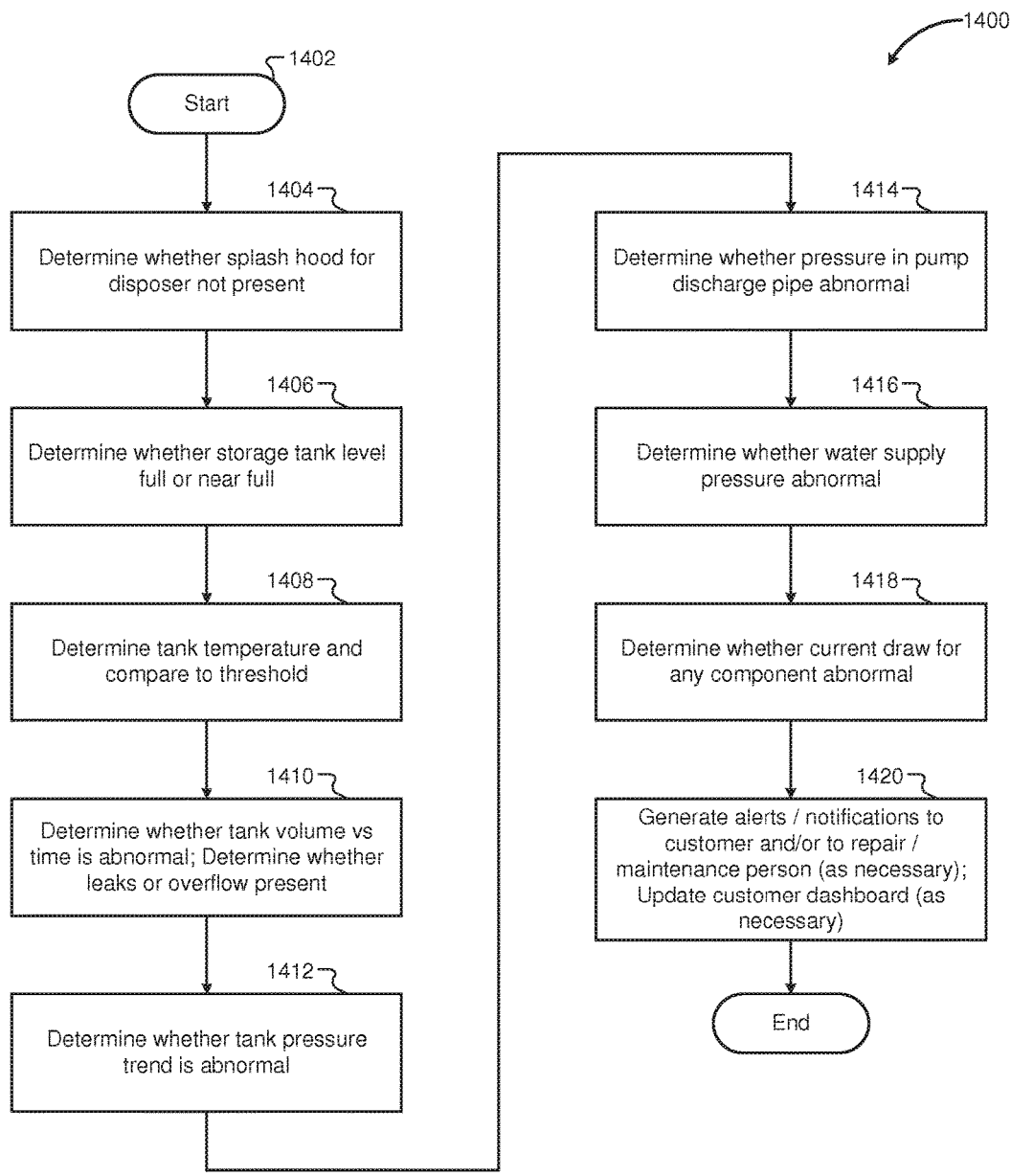
FIG. 14 is a flowchart depicting an example method for a food waste disposal, storage, and treatment system in accordance with an aspect of the present disclosure.

With reference to FIG. 14, a control algorithm 1400 is shown for generating particular alerts or notifications related to immediate maintenance or malfunction issues. The control algorithm 1400 is performed by the alerts/immediate maintenance module 420. The control algorithm 1400 and the functionality shown in FIG. 14 are encapsulated at block 912 of FIG. 9. For example, the alerts/immediate maintenance module 420 can monitor the equipment components to identify any issue that requires immediate attention. Such issues could then trigger alerts to the customer dashboard of the customer terminal 332. Additionally, the alerts may be communicated via text message or email to a mobile device of an owner or operator of the food disposal and storage system 100 and/or a designated repair person for the food disposal and storage system 100.

The control algorithm 1400 starts at 1402. At 1404, the alerts/immediate maintenance module 420 determines whether the splash hood for the disposer 108 is not present. For example, the alert/immediate maintenance module 420 may receive data from the splash hood sensor 327 indicating that the splash hood of the disposer 108 has been removed. In such case, the remote monitor 330 can generate an alert that the splash hood is not present and/or disable the disposer 108 or the food disposal and storage system 100. At 1406, the alerts/immediate maintenance module 420 determines whether the storage tank level is full or near full such that it is close to overflowing or will be overflowing in the near future. For example, if the storage tank 105 is close to being full, the remote monitor may communicate with the controller 124 to indicate that the storage tank 105 is near full on the user interface 328. Additionally, if the storage tank 105 is full and will soon overflow, the remote monitor 330 can communicate with the controller 124 to disable the food disposal and storage system 100 so that no additional food waste is pumped to the storage tank 105.

At 1408, the alerts/immediate maintenance module 420 determines the current temperature of the storage tank 105 and compares the current temperature to a threshold. For example, if the temperature of the storage tank 105 is below a predetermined threshold, the slurry mix in the storage tank 105 may be close to freezing. Further, a low storage tank temperature may indicate that the storage tank heaters 128 are malfunctioning.

At 1410, the alerts/immediate maintenance module 420 may determine whether the current tank volume versus operation of the system over time is abnormal. For example, if the current run time of the food disposal and storage system 100 is such that a greater tank volume would be expected, the lower tank volume may indicate that a leak is present in the system or that the storage tank 105 is overflowing.

At 1412, the alerts/immediate maintenance module 420 determines whether the current tank pressure trend is abnormal. For example, if the pressure within the tank is not increasing as expected upon the pumping of additional food waste into the storage tank 105, the air admittance valve 210 or the discharge valve 202 may have been left open or partially open.

At 1414, the alerts/immediate maintenance module 420 determines whether the pressure in the pump discharge pipe 120 is abnormal. For example, a greater than normal pressure in the pump discharge pipe 120 may indicate that the pump discharge pipe 120 is clogged or obstructed or that there is a clog or an obstruction in the storage tank 105. Additionally, if the pressure within the pump discharge pipe 120 is lower than expected during operation of the pump 118, this may indicate that the pump is malfunctioning.

At 1416, the alerts/immediate maintenance module 420 determines whether the water supply pressure is abnormal based on the flow sensor 308a. For example, if the water supply pressure is abnormal, this may indicate that the water supply has been turned off or that there is an obstruction somewhere in the water supply 300.

At 1418, alerts/immediate maintenance module 420 determines whether the current draw for any component is abnormal. For example, the alerts/immediate maintenance module 420 may receive electrical data from the current sensors 306. An increased or decreased current draw for any particular component may indicate that the component is malfunctioning. For example, a drop in current flow to either the pump 118 or the disposer 108 or electric motor that powers the pump 118 or the electric motor that powers the disposer 108 is jammed or locked.

At 1420, the alerts/immediate maintenance module 420, along with the reporting module 404, can generate alerts/notifications to the customer and/or to repair or maintenance personnel designated for the particular food disposal and storage system 100, as necessary. Further, the alerts/immediate maintenance module 420 and the reporting module 404 can update the customer dashboard of the customer terminal 332, as necessary, based on the determinations described above with respect to 1404 through 1418. Additionally, alerts/immediate maintenance module 420 can communicate with controller 124 to appropriately update the user interface 328 to indicate any issues with the equipment.

Figure 15:
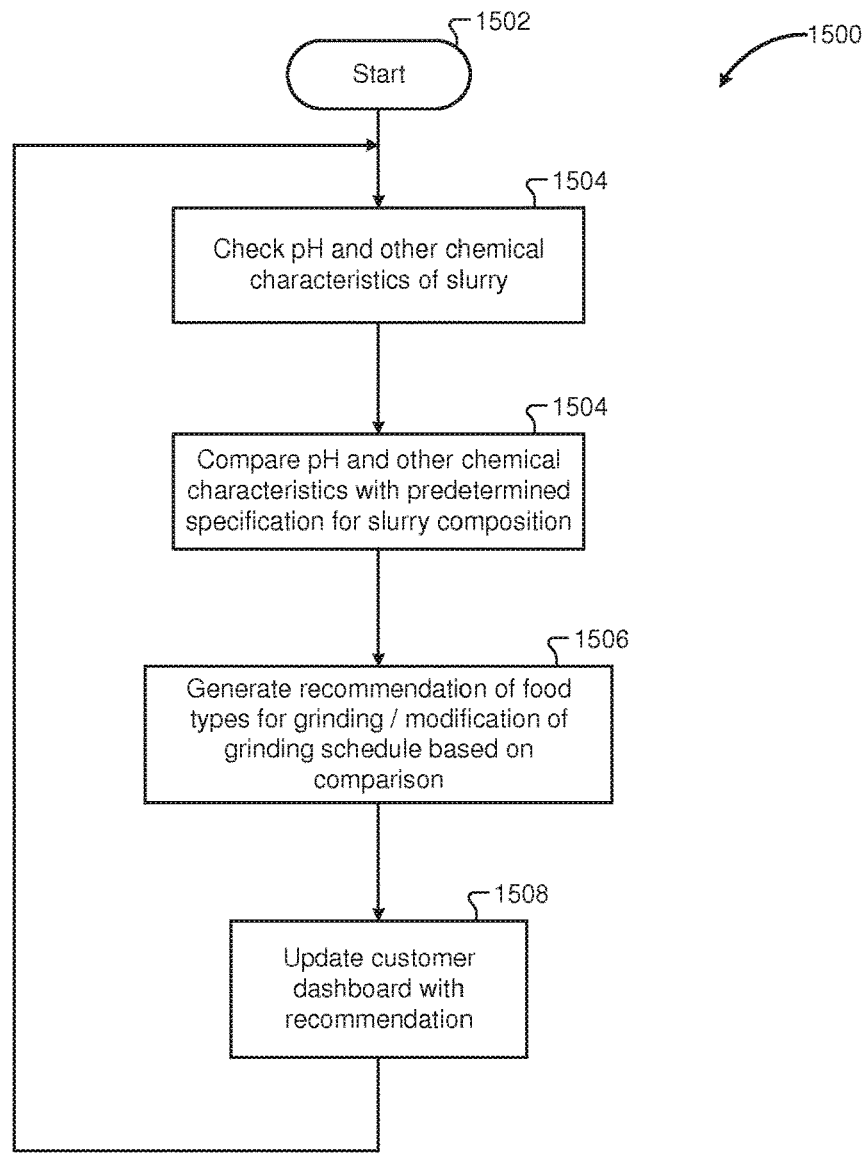
FIG. 15 is a flowchart depicting an example method for a food waste disposal, storage, and treatment system in accordance with an aspect of the present disclosure.
Figure 16:
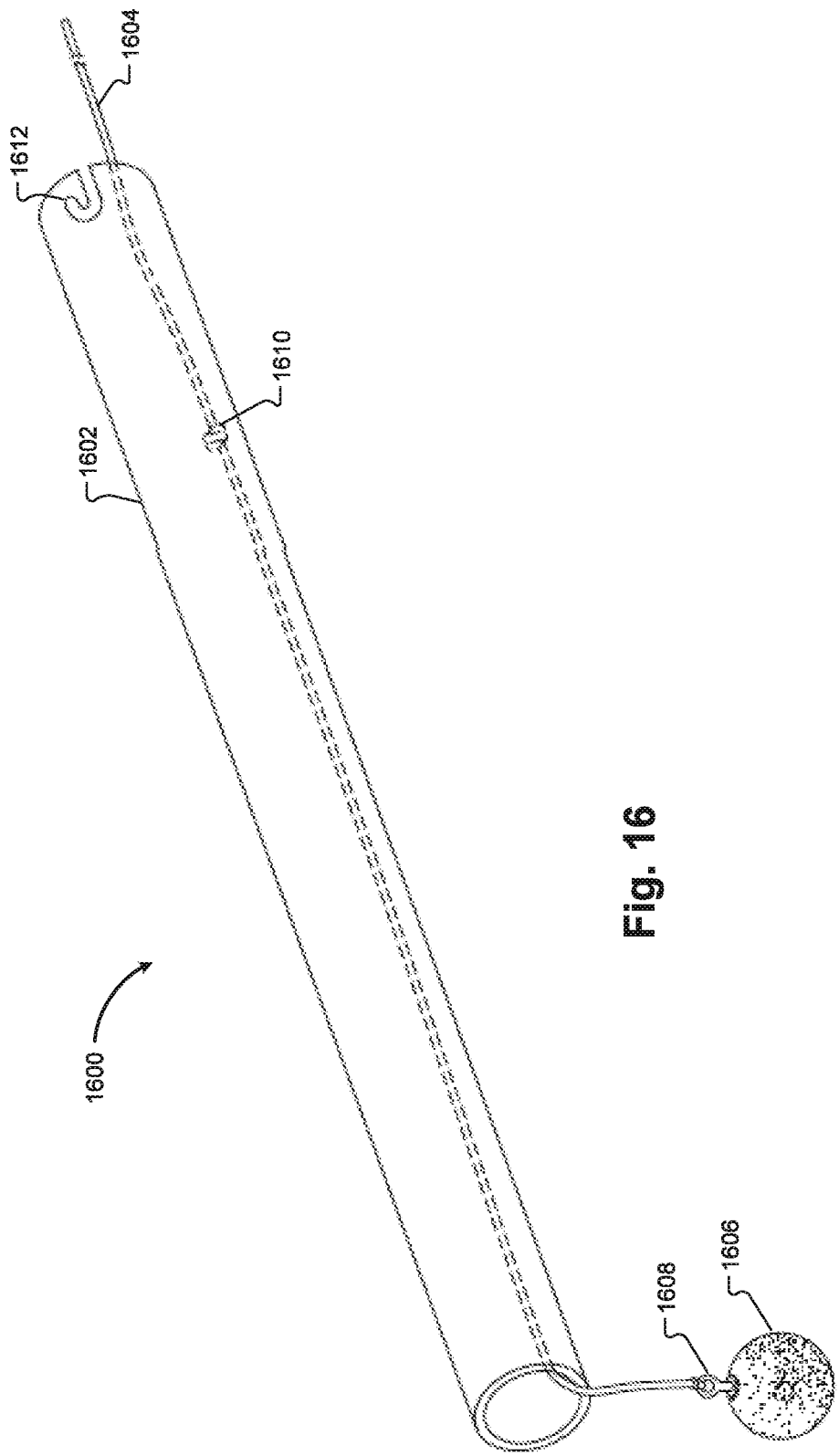
FIG. 16 is a perspective view of a core sampler in accordance with an aspect of the present disclosure.

With reference to FIG. 15, a control algorithm 1500 is shown for generating a recommendation for particular food types for grinding and/or a modification of a current food grinding schedule, to meet a particular slurry composition specification. The control algorithm 1500 is performed by the remote monitor 330 and starts at 1502.

At 1504, the remote monitor 330 receives the pH and other chemical characteristics of the slurry mix in the storage tank 105. For example, the remote monitor 330 may obtain, through the controller 124, the pH data from the pH sensor 316 and/or other chemical composition data of the slurry mix from the other chemical composition sensors 318. At 1504, the remote monitor 330 determines whether the chemistry of the slurry mix meets the requirements of a predetermined specification for slurry composition. For example, the specification may indicate a specific application with specific pH and/or other chemical characteristics. For example, a predetermined chemical composition specification may indicate that the target chemical composition for the slurry mix should be: food waste slurry of finely ground food waste, no particles of which are larger than a half inch, mixed with water to a final consistency in the range of 8% to 15% total solids, greater than 90% volatile solids, a pH in the range of 4.0 to 10.0, a specific gravity of 0.95 to 1.10, Chemical Oxygen Demand of 70,000 to 200,000 milligrams per liter, Total Organic Carbon greater than 9,000 milligrams per liter, Total Kjeldahal Nitrogen less than 7,500 milligrams per liter, and represented by the general stoichiometric formula $C_{21.63}H_{34.21}O_{12.66}N$. As another example, the predetermined chemical composition specification may indicate that the target chemical composition for the slurry mix should be: food waste slurry of finely ground food waste, no particles of which are larger than a half inch, mixed with water to a final consistency in the range of 8% to 15% total solids, greater than 90% volatile solids, a pH in the range of 4.0 to 10.0, a specific gravity of 0.95 to 1.10, Chemical Oxygen Demand of 70,000 to 200,000 milligrams per liter, Total Organic Carbon greater than 40,000 milligrams per liter, Total Kjeldahal Nitrogen less than 7,500 milligrams per liter, and represented by the general stoichiometric formula $C_{21.63}H_{34.21}O_{12.66}N$.

At 1506, based on the comparison with the predetermined specification, the remote monitor 330 may generate particular recommendations of food types for grinding or a modification of a current food grinding schedule. For example, if the food facility is a grocery store, based on the composition of the slurry and the comparison with the specification, the remote monitor 330 may recommend that food waste from a bakery department or from a meat department be processed next to move the chemical characteristics of slurry closer to the target of the predetermined specification. For further example, if the food facility is a grocery store, based on the composition of the slurry and the comparison with the specification, the remote monitor 330 may recommend that an existing grinding schedule be modified in an effort to move the chemical characteristics of the slurry closer to the target of the predetermined specification. For example, if the food facility is a grocery store, the current grinding schedule may be such that the meat department disposes of meat type food waste on Mondays, the bakery disposes of bakery type food waste on Tuesdays, and the produce department disposes of produce type food waste on Wednesdays. Based on the comparison with the specification, the remote monitor 330 may recommend that the existing schedule be modified in an effort to move the chemical characteristics of the slurry closer to the target of the predetermined specification. For example, the remote monitor 330 may recommend that the order be changed so that the bakery department disposes of food waste on Monday, and that food waste from the meat and produce departments be held for a day and then disposed of on Wednesday.

At 1508, the remote monitor 330 may notify the customer terminal 332 and update the customer dashboard of the customer terminal 332 with the recommendations. After 1508, the remote monitor 330 loops back to 1504.

With respect to each of the control algorithms described above, including control algorithms 500, 600, 700, 800, 900, 1000, 1100, 1200, 1300, 1400, 1500, while the particular steps, calculations, measurements, etc., for the particular control algorithms are discussed in a particular order, it is understood that the steps, calculations, measurements, etc. could be performed in a different order, or concurrently, to accomplish the described functionality. Additionally, some of the steps, calculations, measurements, etc. could be omitted.

As discussed above, the particular chemical composition of the slurry mix in the storage tank 105 may be examined to determine its applicability for particular applications and whether it meets certain predetermined chemical composition specifications as may be indicated, for example, by particular anaerobic digestion facilities. As such, it may be useful to use a core sampler device, including a hollow tube, for example, with removable end cap. The core sampler, for example, can be inserted into the slurry mix in the storage tank 105 with the end cap removed and pushed to the bottom of the storage tank 105. When the core sampler reaches the bottom of the storage tank, the end cap can be seated onto the end of the core sampler tube by way of a string or tube, for example, routed inside the core sampler tube. At such point, the core sampler can be removed and a sample of the slurry mix, including any separation of the slurry mix in the storage tank 105, can be extracted and analyzed.

With reference to FIGS. 16, 17A, 17B, and 18, a core sampler 1600 is shown and includes a hollow tube 1602 with a cord 1604 positioned through the interior of the hollow tube 1602. The cord 1604 includes a foam ball end cap 1606 positioned at the end and attached to the cord with an eye bolt 1608. A diameter of the foam ball end cap 1606 is slightly larger than an interior diameter of the hollow tube 1602. The cord 1604 includes a knot 1610 positioned to be received by a notch 1612 in the hollow tube 1602.

Figure 17A:
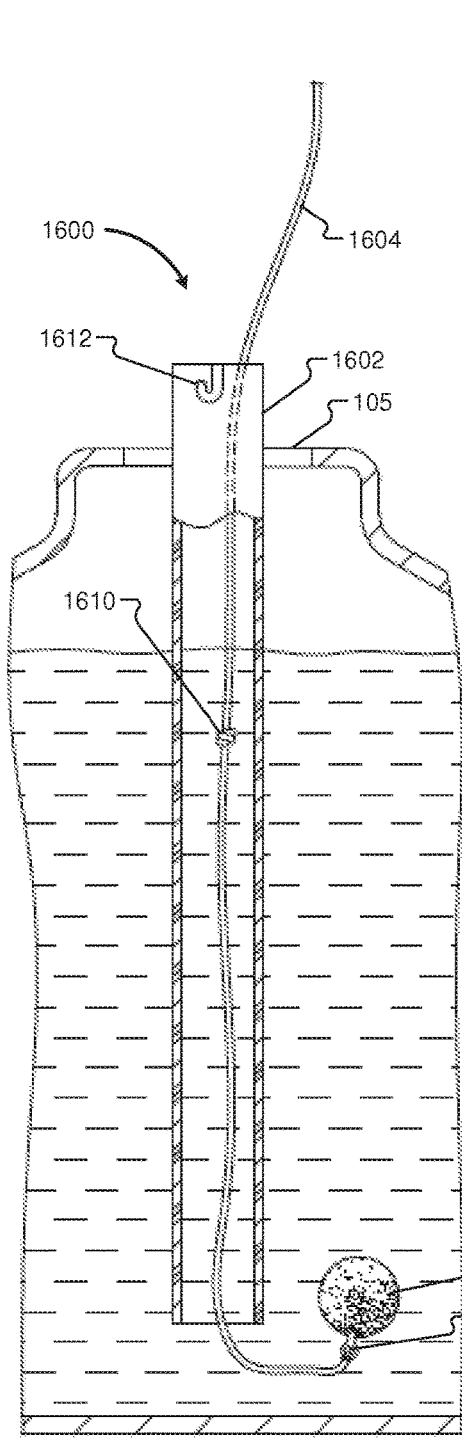
FIG. 17A is a cross-sectional view of the core sampler shown in FIG. 16 in a storage tank.

As shown in FIG. 17A, the core sampler 1600 is lowered into the storage tank 105 with the end cap 1606 removed so that the hollow tube 1602 fills with the contents of the storage tank 105. The core sampler 1600 can be inserted into the storage tank 105 in a vertical manner so that the contents of the hollow tube 1602, and the gradient of materials from the bottom of the storage tank 105 to the top of the storage tank 105, match the gradient of materials from the bottom of the core sampler 1600 to the top of the core sampler 1600.

Figure 17B:
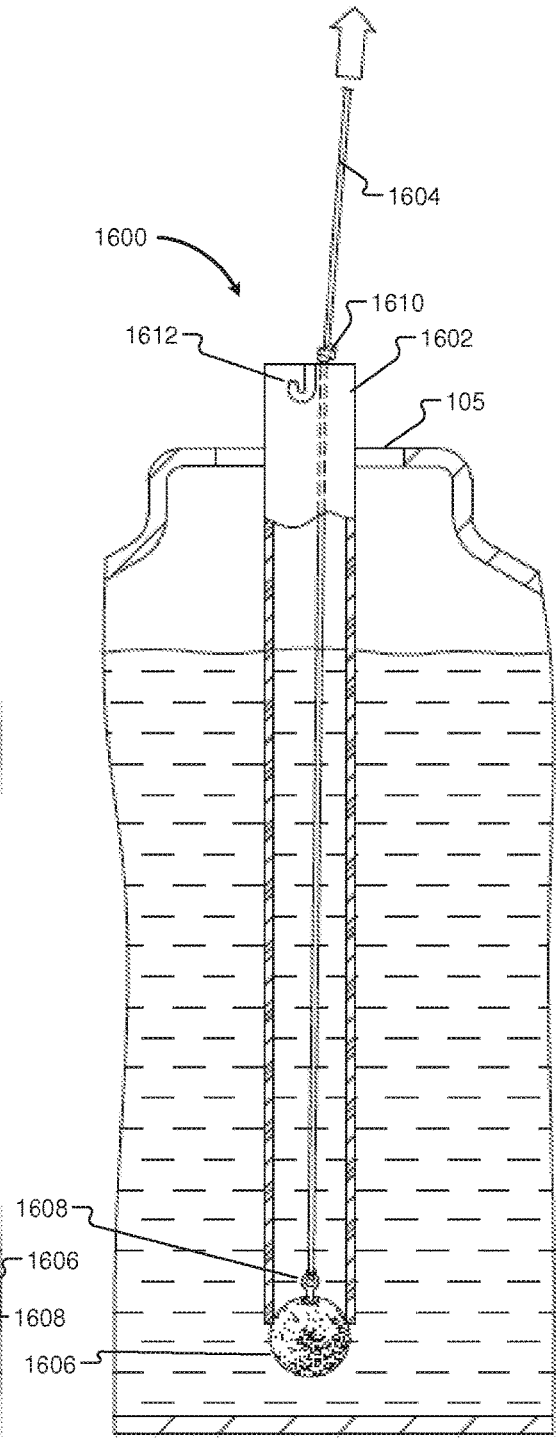
FIG. 17B is a cross-sectional view of the core sampler shown in FIG. 16 in a storage tank.

As shown in FIG. 17B, once the end of the hollow tube 1602 reaches the bottom of the storage tank, an operator of the core sampler 1600 can pull the cord 1604 upwards so that the cord 1604 becomes taut and the end cap 1606 becomes tightly seated in the end of the hollow tube 1602.

Figure 18:
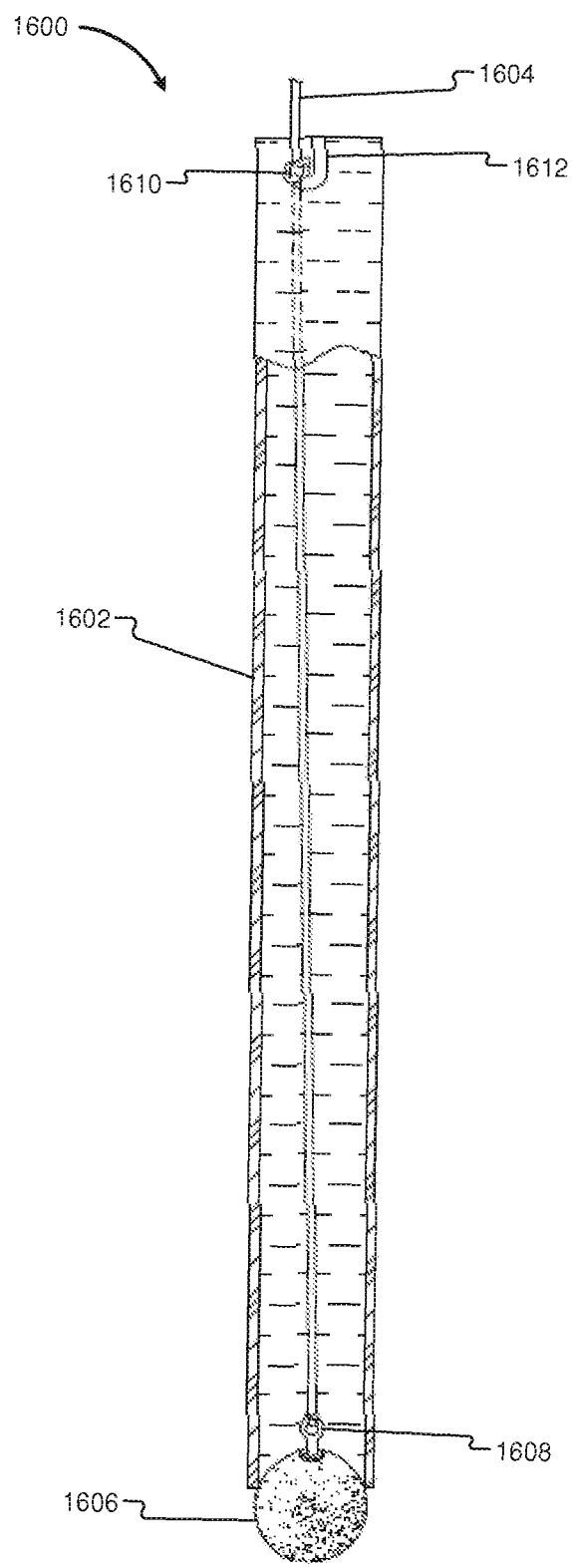
FIG. 18 is a cross-sectional view of the core sampler shown in FIG. 16.

As shown in FIG. 18, once the cord 1604 is taut and the end cap 1606 is seated in the end of the hollow tube 1602, the knot 1610 can be seated in the notch 1612 in the sidewall of the hollow tube 1602. At this point, the core sampler 1600 can be removed from the storage tank 105 and the contents of the core sampler 1600 can be reviewed, analyzed, and tested.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

For purposes of clarity, the same reference numbers are used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently), as appropriate, without altering the principles of the present disclosure.

As used herein, the term module may refer to, be part of, or include: an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first stage, element, component, region, layer or section discussed below could be termed a second stage, element, component, region, layer or section without departing from the teachings of the example embodiments.

What is claimed is:

1. A system comprising:
    a food loading station located at a facility that processes food waste, the food loading station having a grinder that grinds food waste into a slurry of food waste and water;
    a storage tank that receives the slurry of food waste and water from the grinder for storage until the slurry is collected for transportation to an anaerobic digestion facility; and
    a discharge outlet installed on the storage tank configured to connect to a discharge hose of a collection truck, the discharge outlet having an air admittance valve configured to admit ambient air into the discharge hose while the slurry is sucked out of the storage tank through the discharge hose and into the collection truck.

2. The system of claim 1 wherein the air admittance valve is manually adjustable.

3. A method comprising:
    grinding food waste with a grinder installed in a food loading station located at a facility that processes food waste;
    receiving a slurry of food waste and water from the grinder with a storage tank that stores the slurry;
    connecting a discharge outlet installed on the storage tank to a discharge hose of a collection truck, the discharge outlet having an air admittance valve; and
    admitting ambient air into the discharge hose with the air admittance valve while the slurry is sucked out of the storage tank through the discharge hose and into the collection truck.

4. The method of claim 3 wherein the air admittance valve is manually adjustable.

5. The method of claim 3, further comprising:
    transporting, with the collection truck, the collected slurry from the storage tank to an anaerobic digestion facility.

* * * * *